United States Patent [19]

Arai et al.

[11] Patent Number: 4,832,465

[45] Date of Patent: May 23, 1989

[54] ZOOM LENS FOR USE IN COPYING

[75] Inventors: Yasunori Arai; Nobutaka Minefuji, both of Tokyo, Japan

[73] Assignee: Asahi Kogaku Kogyo Kabushiki Kaisha, Tokyo, Japan

[21] Appl. No.: 896,148

[22] Filed: Aug. 13, 1986

[30] Foreign Application Priority Data

Aug. 14, 1985 [JP] Japan .................................. 60-179595
Feb. 28, 1986 [JP] Japan .................................. 61-43512

[51] Int. Cl.[4] ............................................. G02B 15/14
[52] U.S. Cl. .................................................... 350/425
[58] Field of Search ............................... 350/425, 423

[56] References Cited

U.S. PATENT DOCUMENTS

| 4,333,711 | 6/1982 | Itoh | 350/425 |
| 4,408,841 | 10/1983 | Arai | 350/425 |
| 4,502,754 | 3/1985 | Kawa | 350/96.20 |
| 4,597,641 | 7/1986 | Arai | 350/425 |

FOREIGN PATENT DOCUMENTS

| 61-3112 | 1/1986 | Japan . |
| 61-292611 | 12/1986 | Japan . |
| 1468846 | 3/1977 | United Kingdom . |

Primary Examiner—John K. Corbin
Assistant Examiner—Scott J. Sugarman
Attorney, Agent, or Firm—Sughrue, Mion, Zinn, Macpeak & Seas

[57] ABSTRACT

A zoom lens comprising a first and a second lens component that are related to each other for zooming. The first lens component consists of four lens elements and has a positive focal length $f_I$ satisfying the condition $0.35 < f_I/f_M < 0.85$, where $f_M$ is the focal length of the system at unit magnification. The second lens component consists of a negative miniscus lens and possibly a positive lens and has a negative focal length $f_{II}$ satisfying the condition, $0.7 < -f_{II}/f_M < 3.0$.

35 Claims, 38 Drawing Sheets

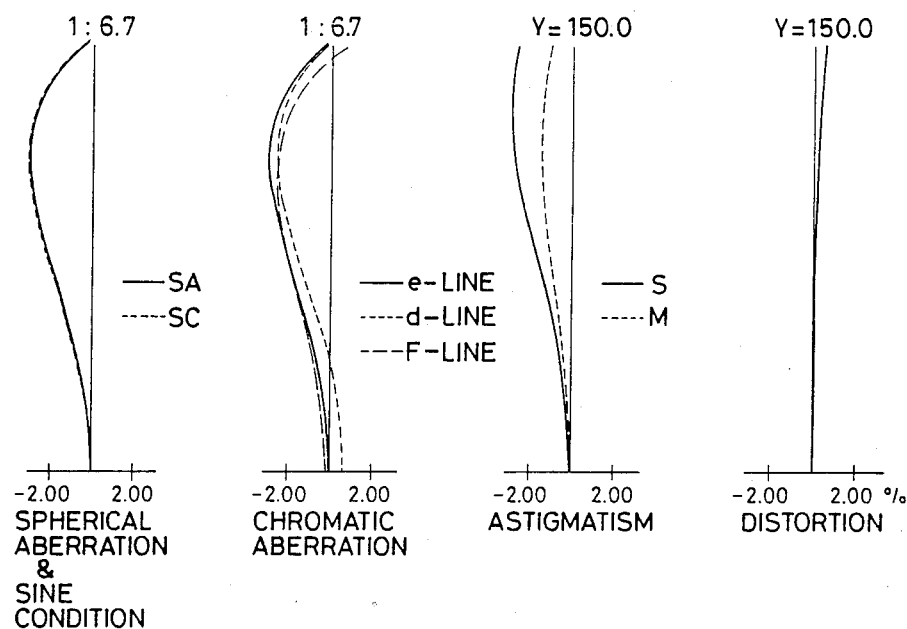
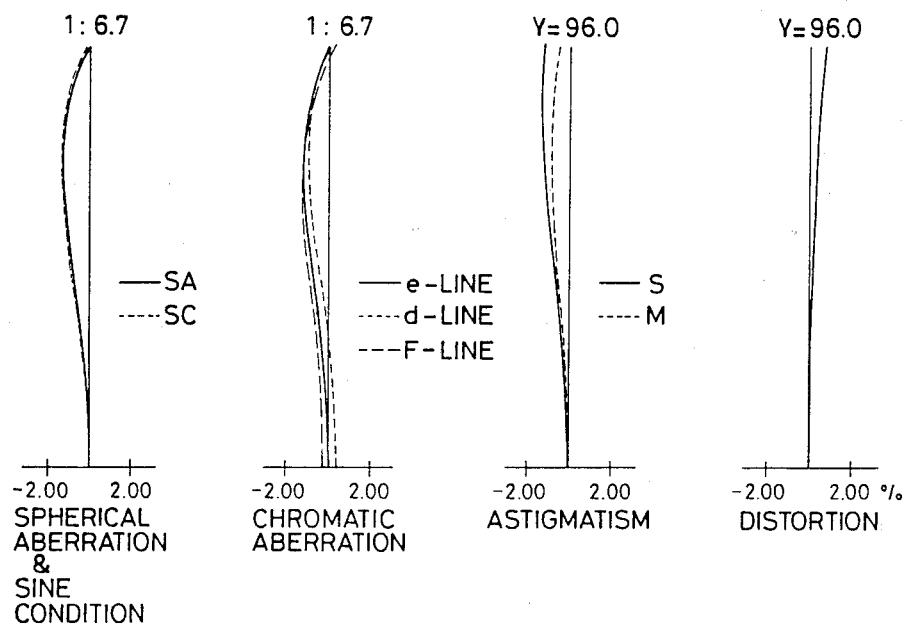

ZOOM LENS FOR USE IN COPYING

BACKGROUND OF THE INVENTION

1. Field of the Invention

The present invention relates to a zoom lens having a constant object-to-image distance for use in copying which has a brightness of the order of $F_{NO}$ 1:7 and which is capable of accommodating a viewing angle of up to $2\omega = 40°$.

2. Background Art

With the increasing demand for smaller and less expensive copying machines, the need to reduce the size and cost of the lenses used in the copying machines is also growing. There is also a strong need to develop an improved version of the type of copying machine which is capable of magnification and reduction of the produced copy. Accordingly, the zoom lens for effecting the desired magnification and reduction must be improved. Prior art zoom lenses for use in copying are described in Unexamined Published Japanese patent application Nos. 68810/1982 and 57311/1985. The system shown in the first reference is composed of 8 lens elements, while the system of the second reference is composed of 7 lens elements, but neither system is completely satisfactory in terms of size and cost.

With a veiw to attaining further reduction in size, the present inventors previously filed Japanese patent applications No. 123991/1984 and No. 135731/1985 in which they proposed a zoom lens composed of 6 lens elements. These systems to some extent have met the requirements for reduction in size and cost but there still is room for improvement in terms of size and cost reduction since the number of lens elements, which account for a substantial portion of the cost of the system, has not been fully reduced. Also, the size is still too large since the distance between the lens groups, particularly in the system of No. 123991/1984, has to be changed by a large amount during zooming.

SUMMARY OF THE INVENTION

The present invention has been accomplished in order to solve the aforementioned problems. Its principal object is to provide an improved zoom lens for use in copying as compared with the systems proposed in Japanese patent applications No. 123991/1984 and No. 135731/1985.

More particularly, an object of the invention is to provide a zoom lens which displays a large zooming ratio and good performance and which yet satisfies the requirements for smaller size and lower cost by employing fewer lens components to realize a similar lens configuration.

The aforementioned object of the present invention is attained by a zoom lens for use in copying which comprises, in order from the object side, a first lens component having a positive focal length and a second lens component having a negative focal length. The distance between the two lens components is changed while they are displaced together as two units from each other so that zooming is effected with the distance between the object plane and the image-focusing plane being held constant.

In this summary, the following terminology is used: $f_I$ is the focal length of the first lens component; $f_{II}$ is the focal length of the second lens component; and $f_M$ is the focal length of the overall lens system at a magnification of unity.

In one aspect of the invention, the first lens component is composed of three or four lens elements while the second lens component consists of a single negative meniscus lens element having its convex surface directed toward the object. The second lens component satisfies the following condition (1):

$$0.7 < -f_{II}/f_M < 3.0 \tag{1}$$

In another aspect of the invention, the first lens component is composed of a first positive lens element, a second negative lens element and a third positive lens element and satisfies the following condition (2):

$$0.35 < f_I/f_M < 0.85 \tag{2}$$

BRIEF DESCRIPTION OF THE DRAWINGS

FIGS. 3, 7, 11, 15, 19, 23, 27, 31, 35, 39, 43, 47, 51, 55, 59, 63, 67, 71 and 75 are graphs plotting the aberration curves obtained at a magnification of 1.42X from the zoom lens systems presented respectively in Examples 1 to 19; and FIGS. 4, 8, 12, 16, 20, 24, 28, 32, 36, 40, 44, 48, 52, 56, 60, 64, 68, 72 and 76 are graphs plotting the aberration curves obtained at a magnification of 0.64X from the zoom lens systems presented respectively in Examples 1 to 19.

Figure 1:
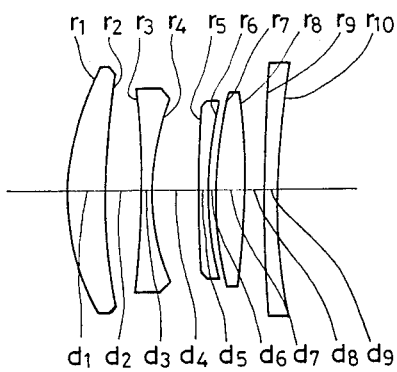
FIGS. 1, 5, 9, 13, 17, 21, 25, 29, 33, 37, 41, 45, 49, 53, 57, 61, 65, 69 and 73 are simplified cross-sectional views of the zoom lens systems presented respectively in Examples 1 to 19.
Figure 2:
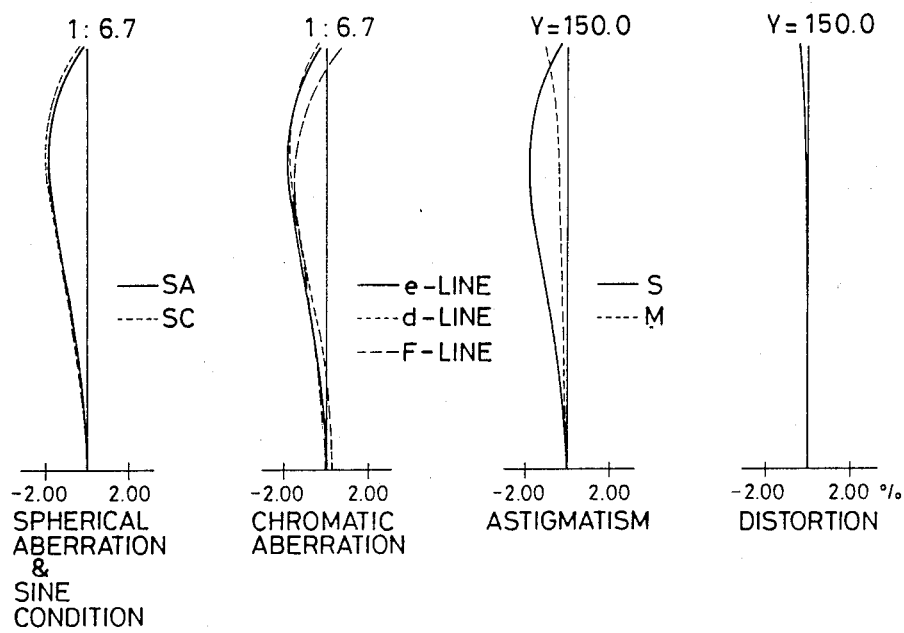
FIGS. 2, 6, 10, 14, 18, 22, 26, 30, 34, 38, 42, 46, 50, 54, 58, 62, 66, 70 and 74 are graphs plotting the aberration curves obtained at a magnification of 1.00X from the zoom lens systems presented respectively in Examples 1 to 19.
Figure 3:
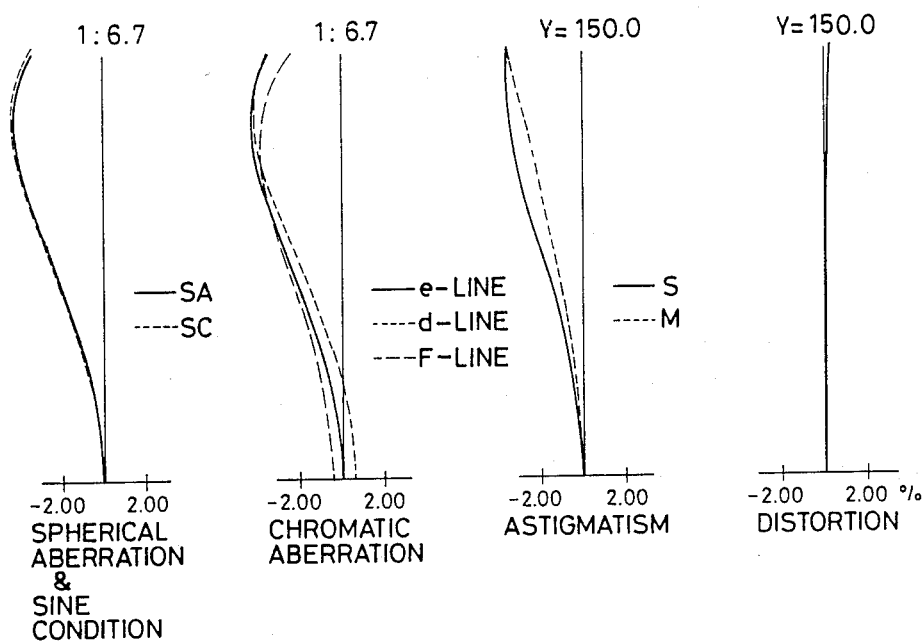
Figure 4:
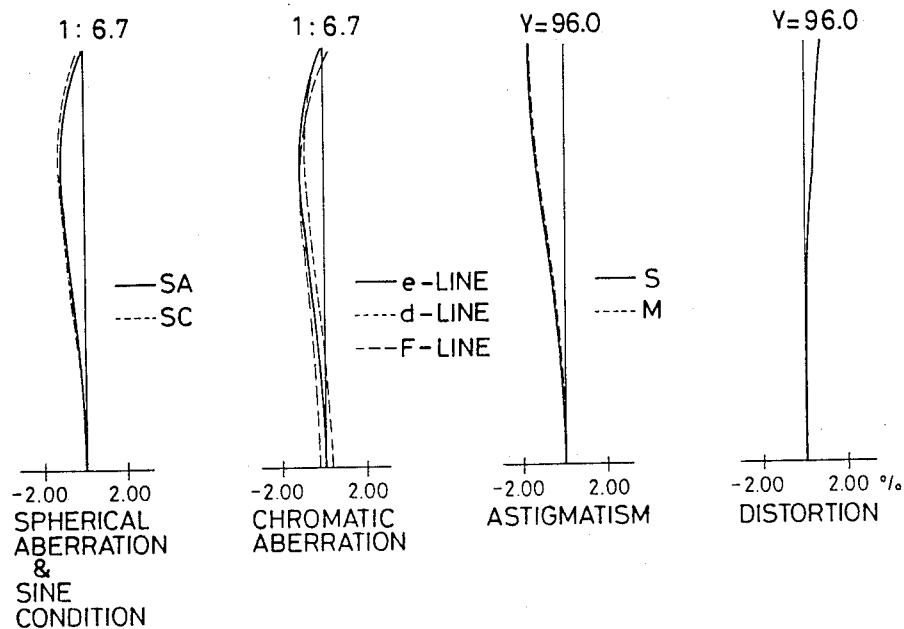
Figure 5:
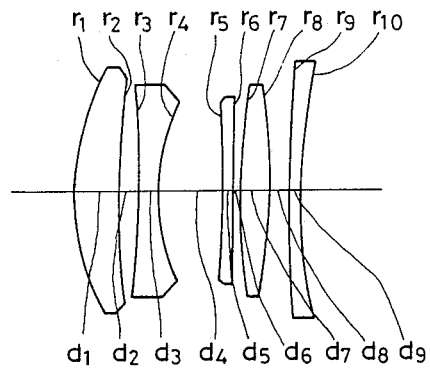
Figure 6:
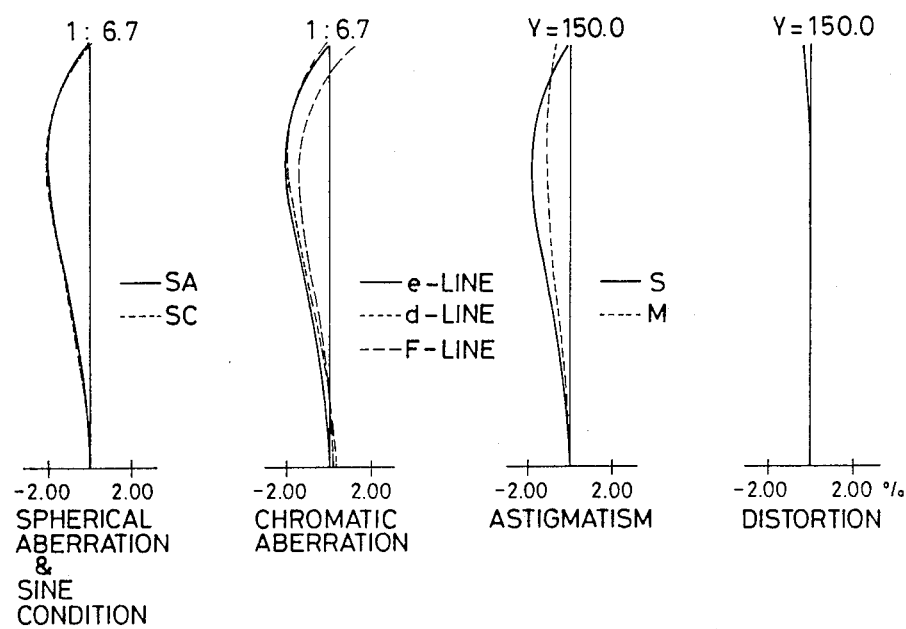
Figure 7:
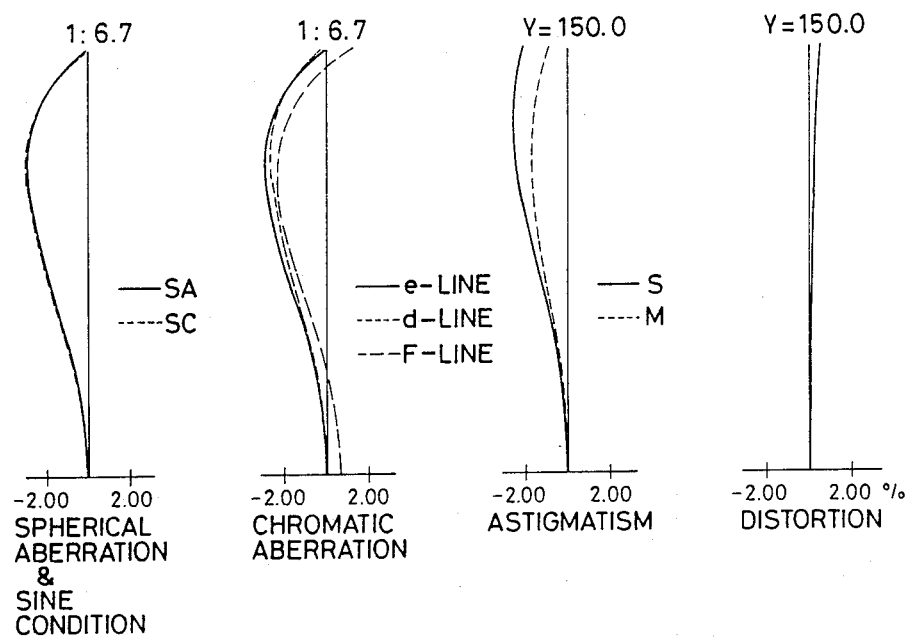
Figure 8:
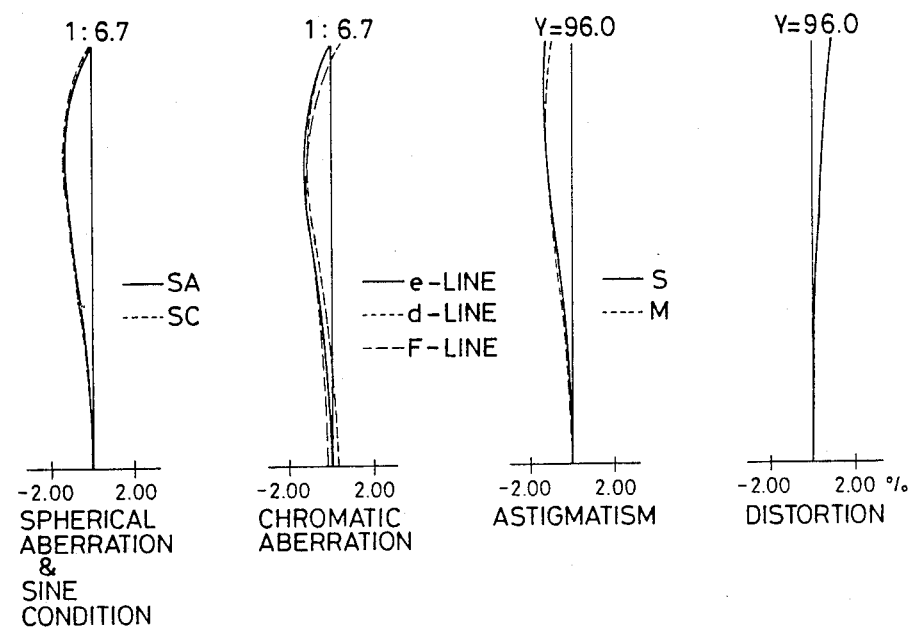
Figure 9:
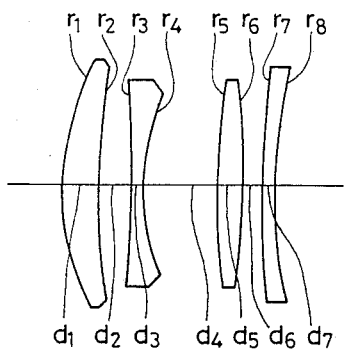
Figure 10:
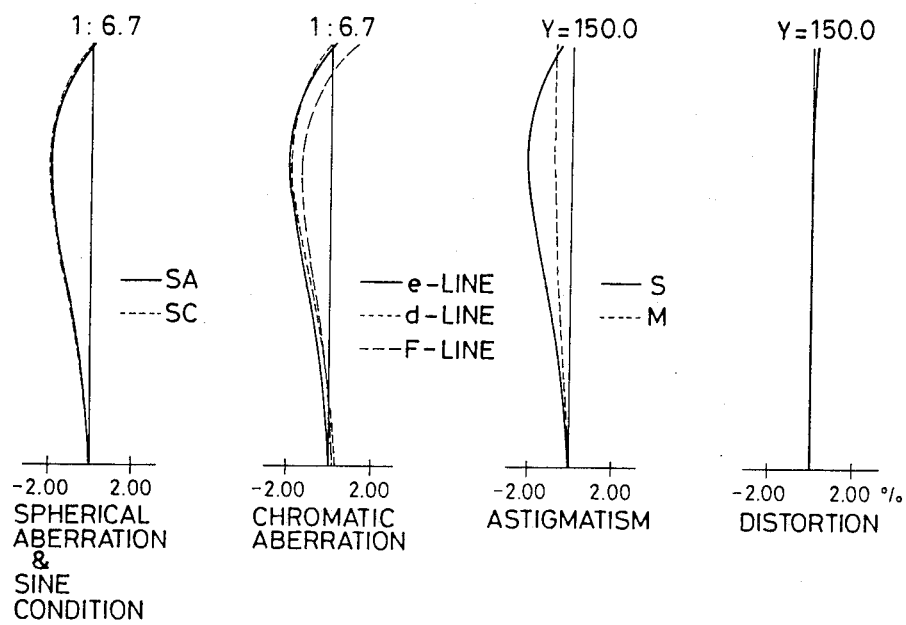
Figure 13:
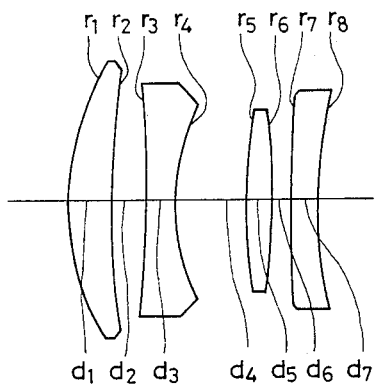
Figure 14:
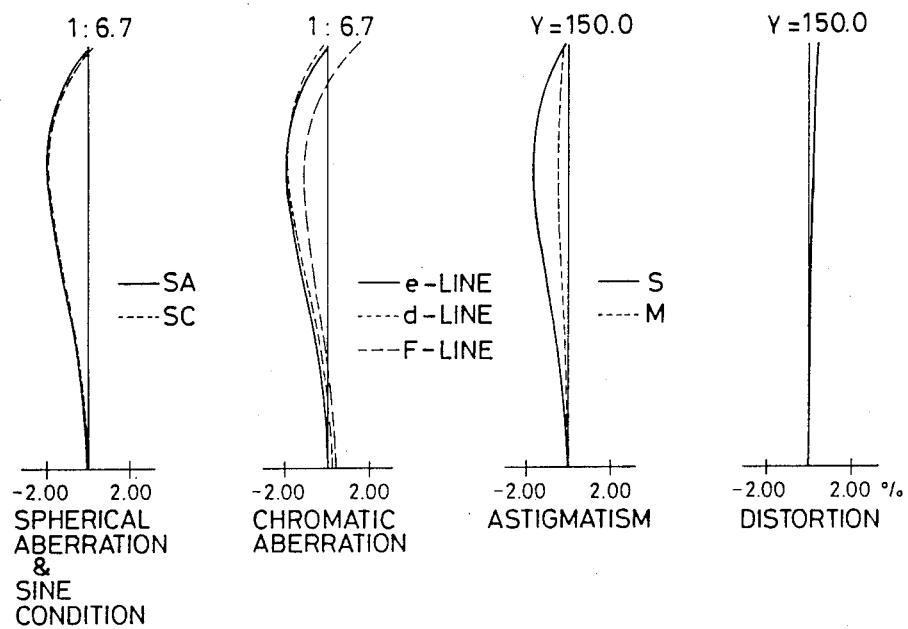
Figure 15:
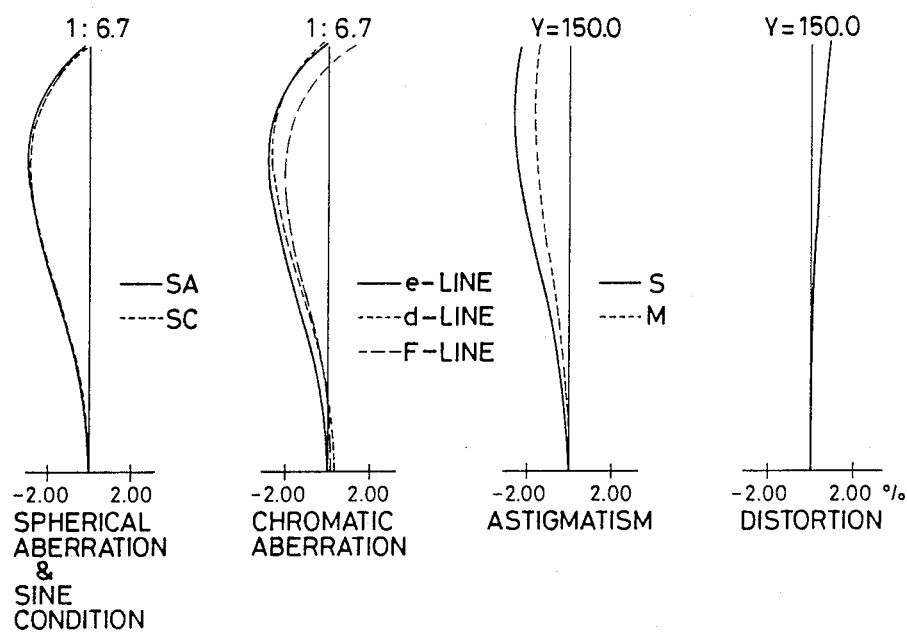
Figure 16:
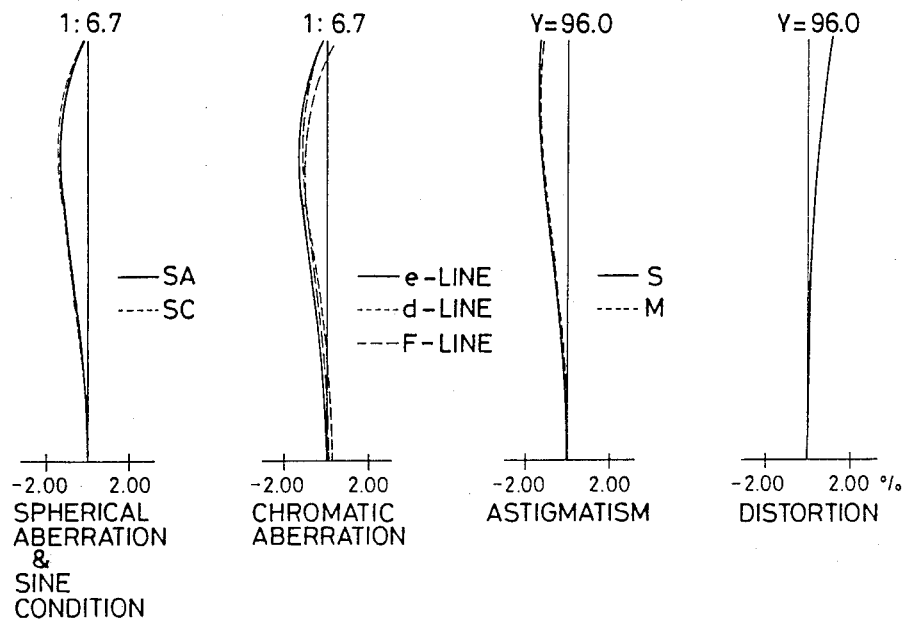
Figure 17:
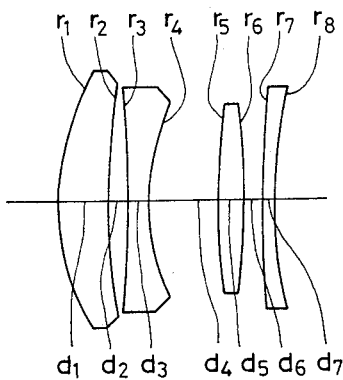
Figure 18:
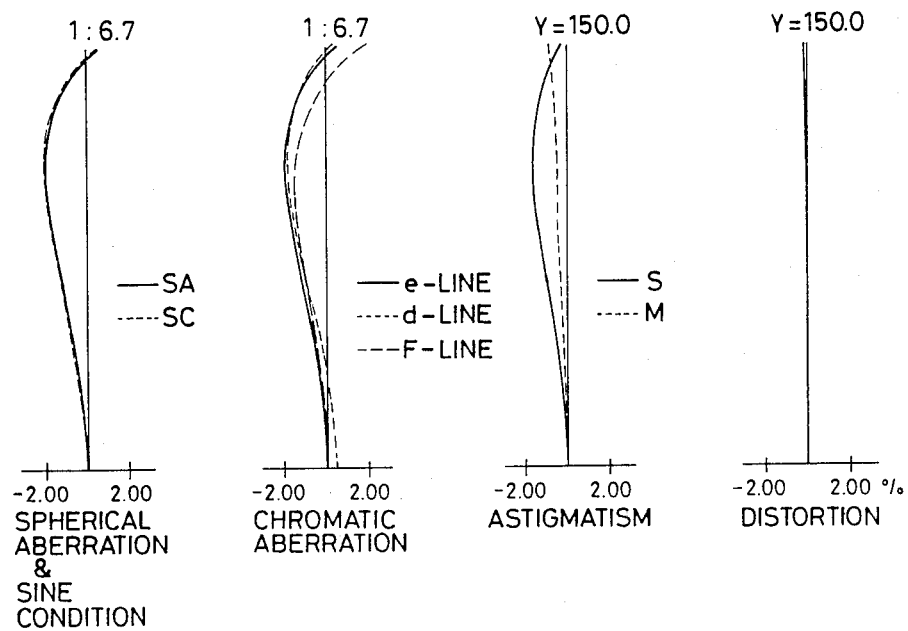
Figure 19:
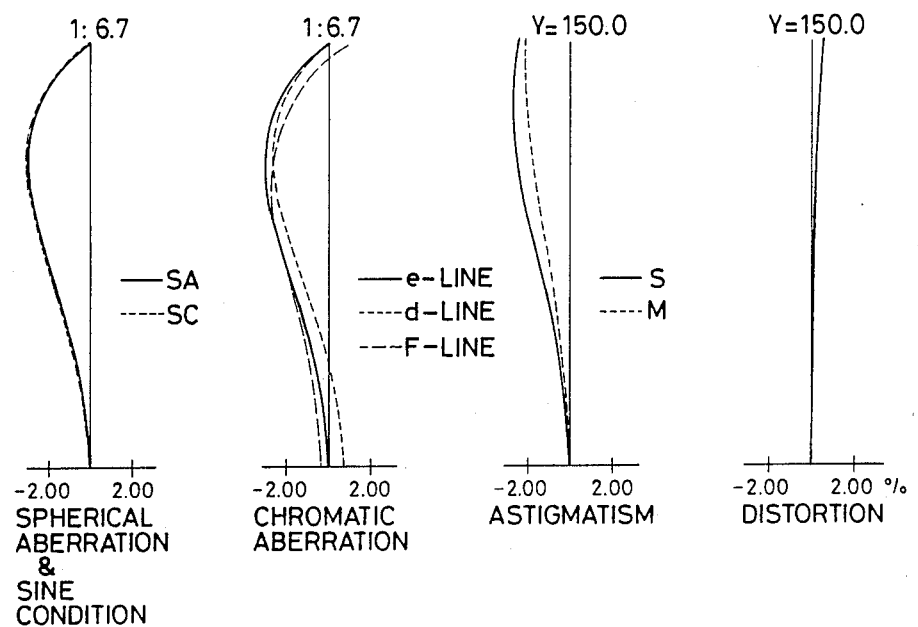
Figure 20:
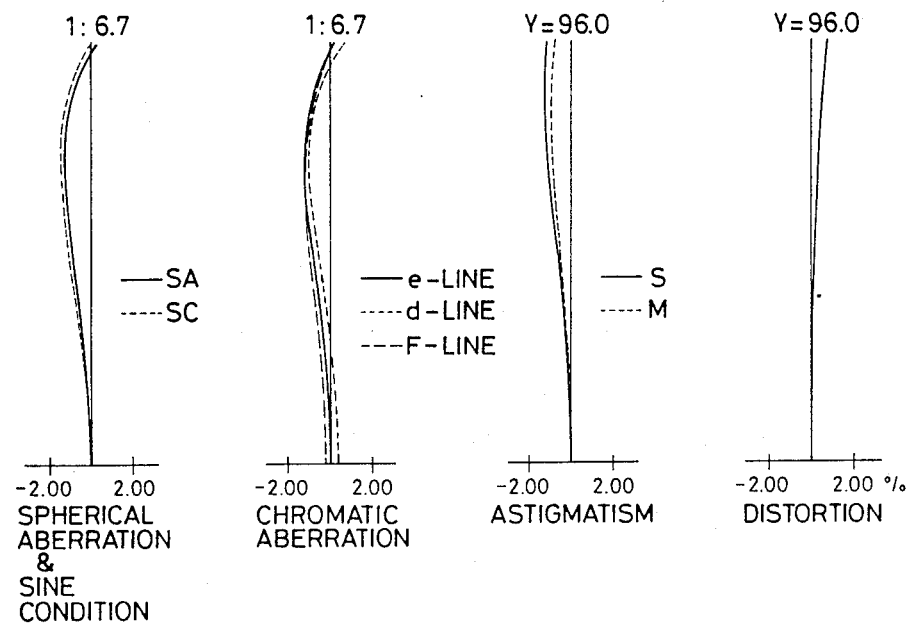
Figure 21:
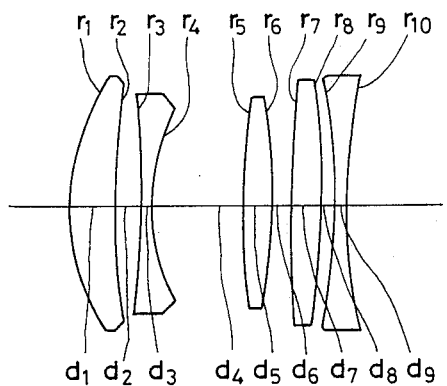
Figure 22:
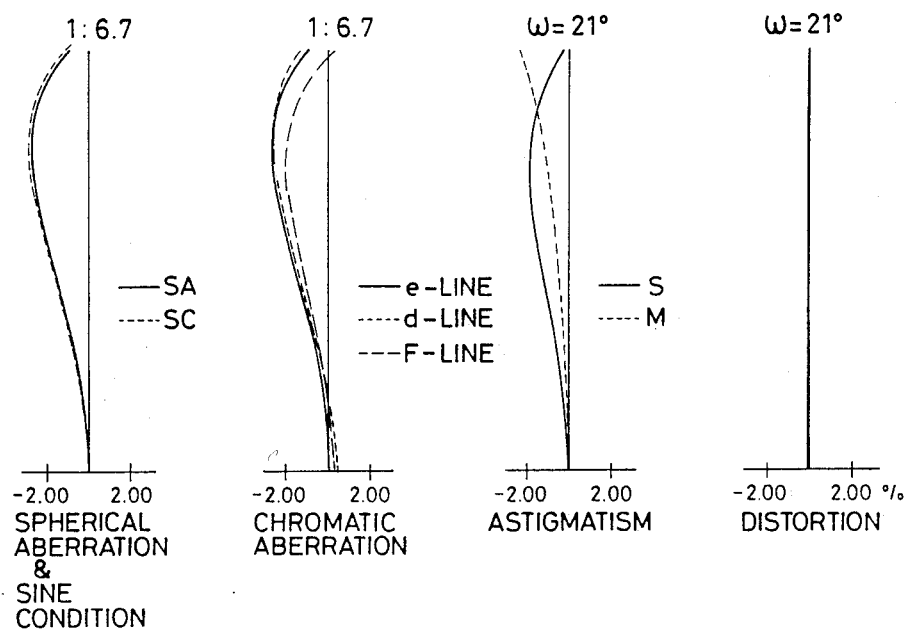
Figure 23:
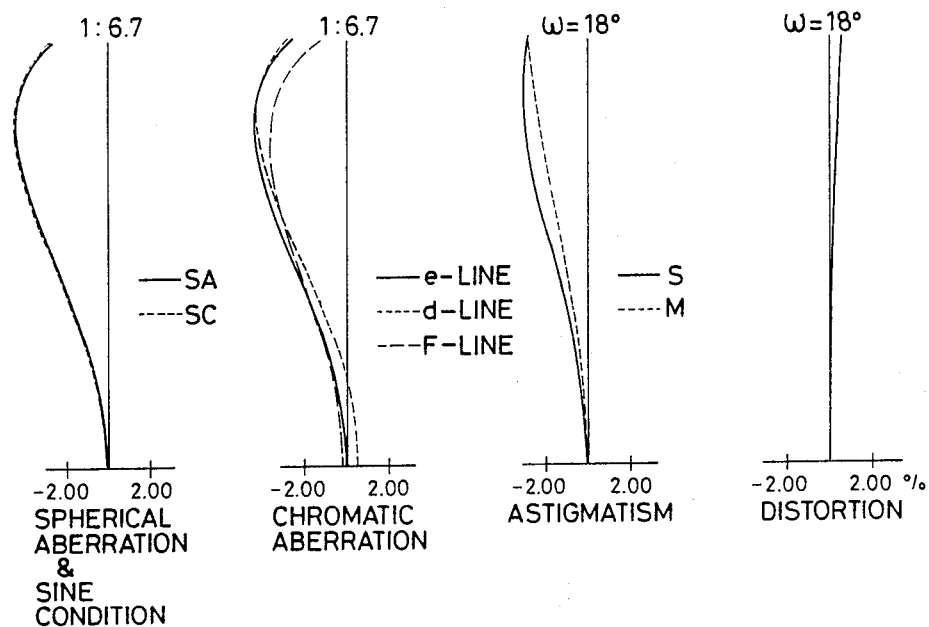
Figure 24:
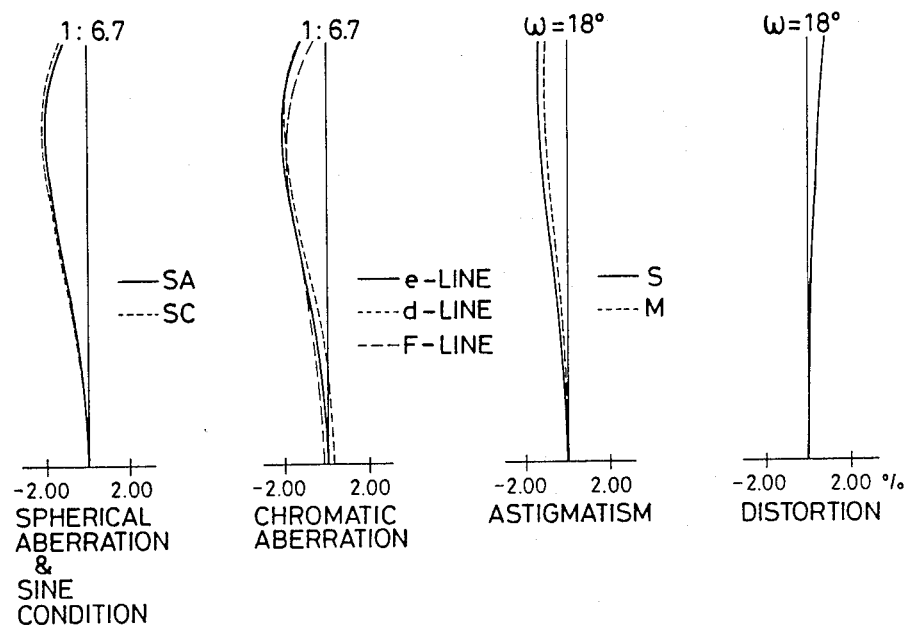
Figure 25:
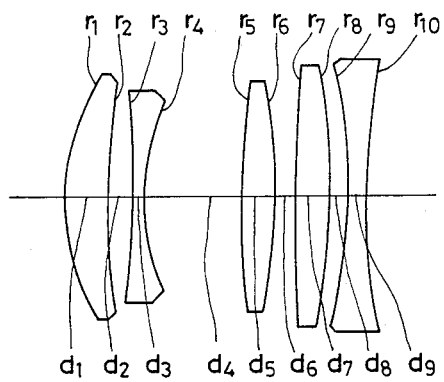
Figure 26:
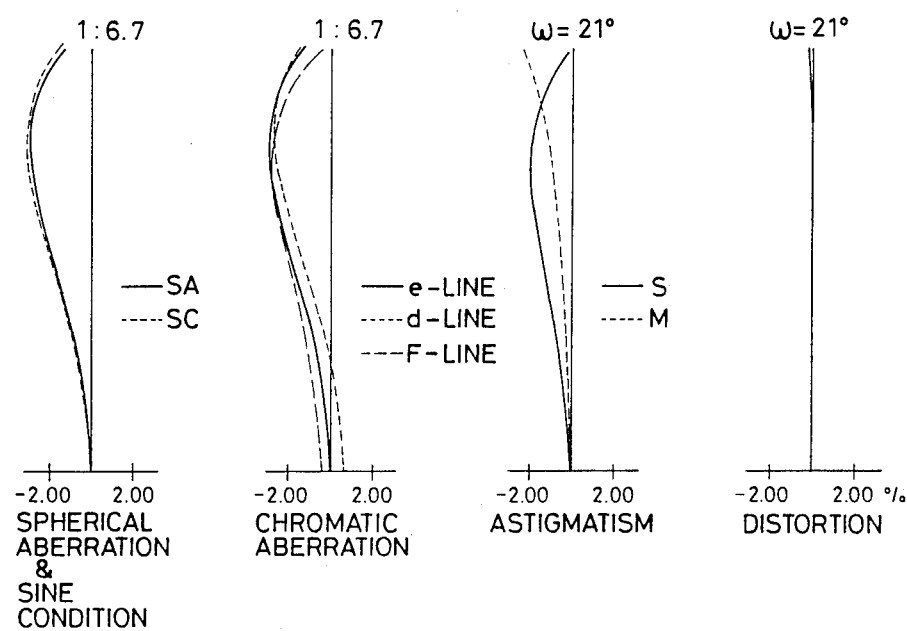
Figure 27:
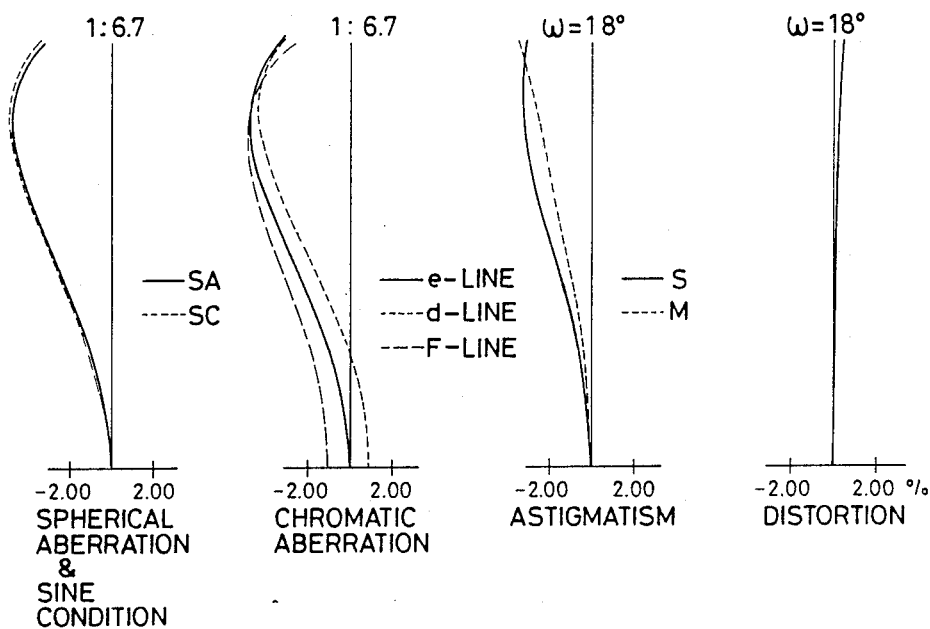
Figure 28:
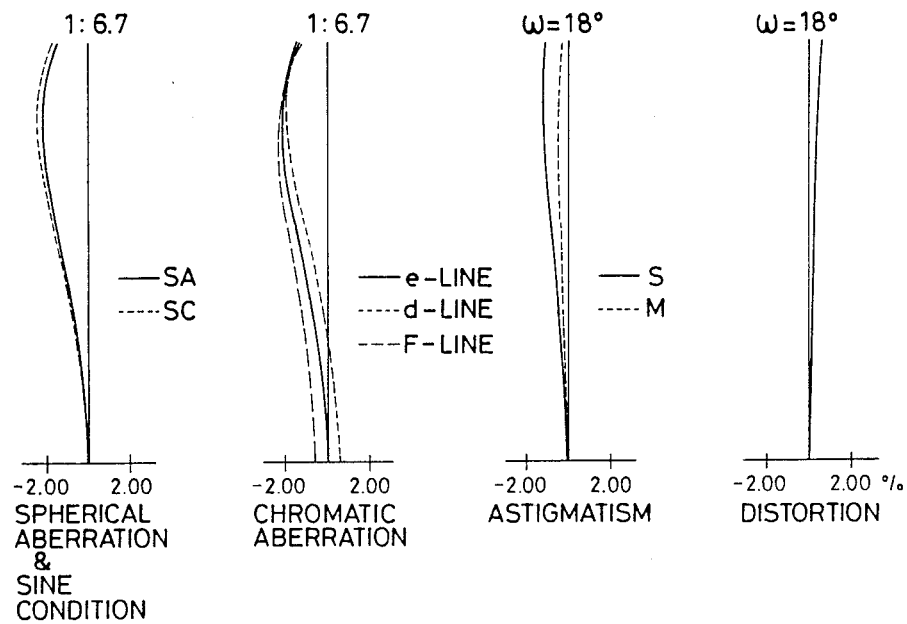
Figure 29:
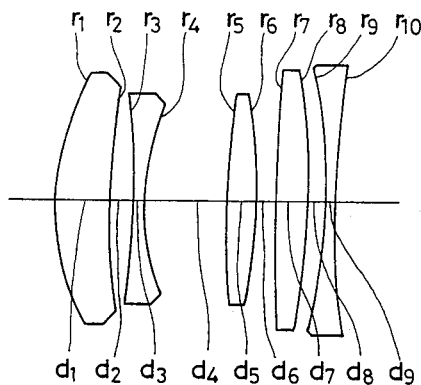
Figure 30:
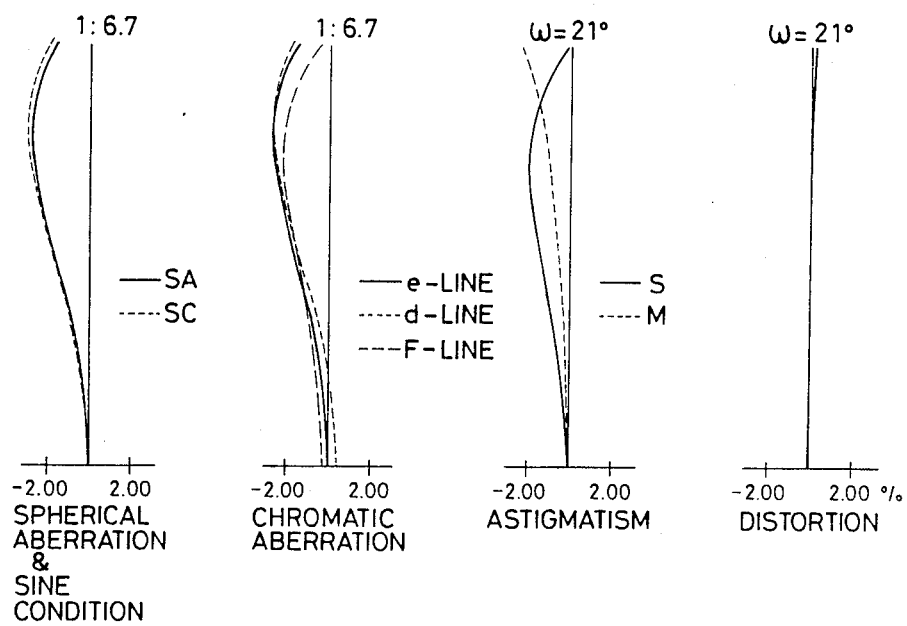
Figure 31:
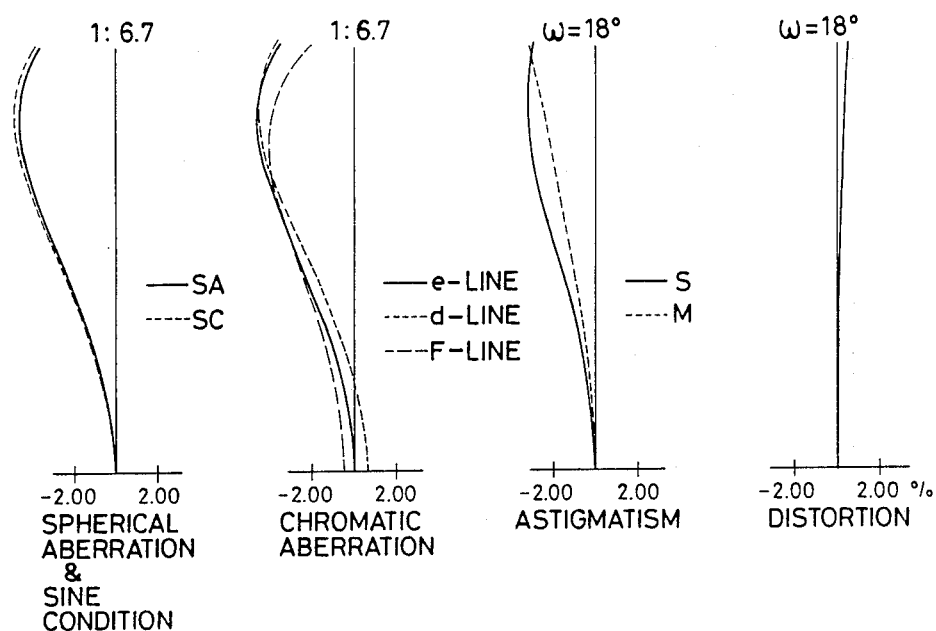
Figure 32:
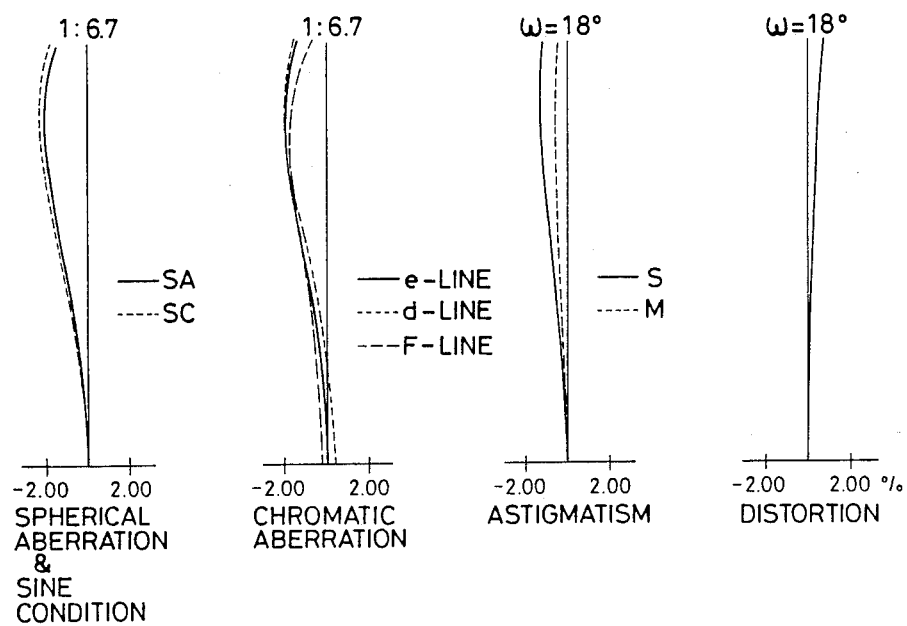
Figure 33:
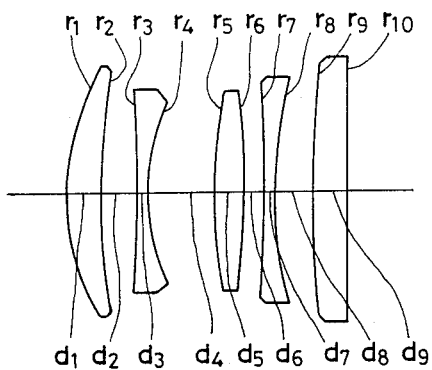
Figure 34:
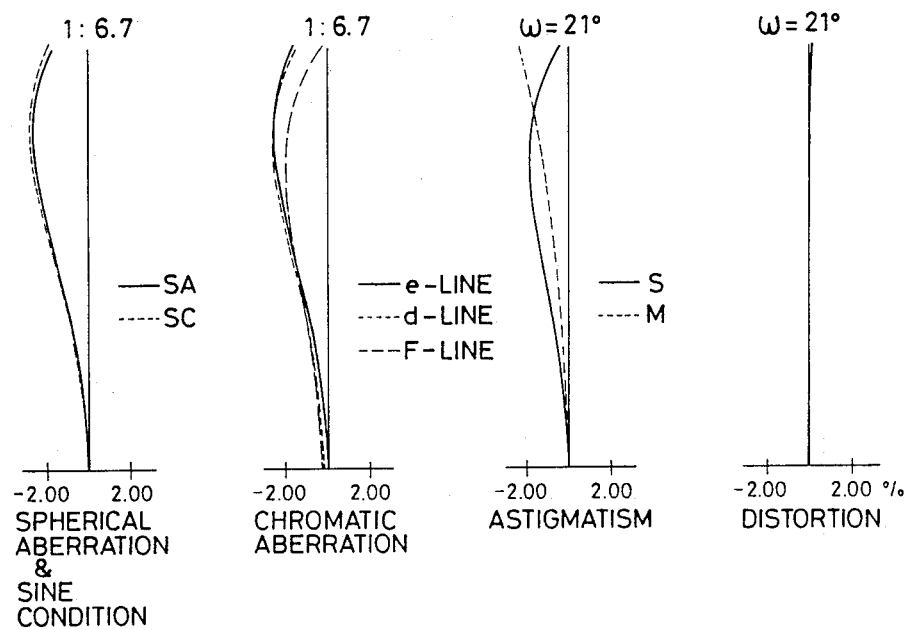
Figure 35:
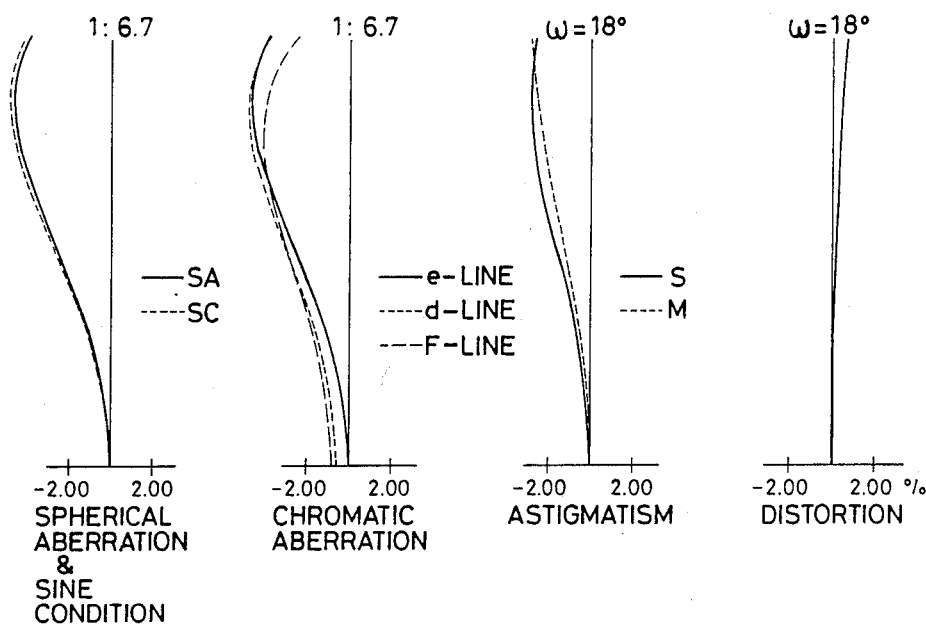
Figure 36:
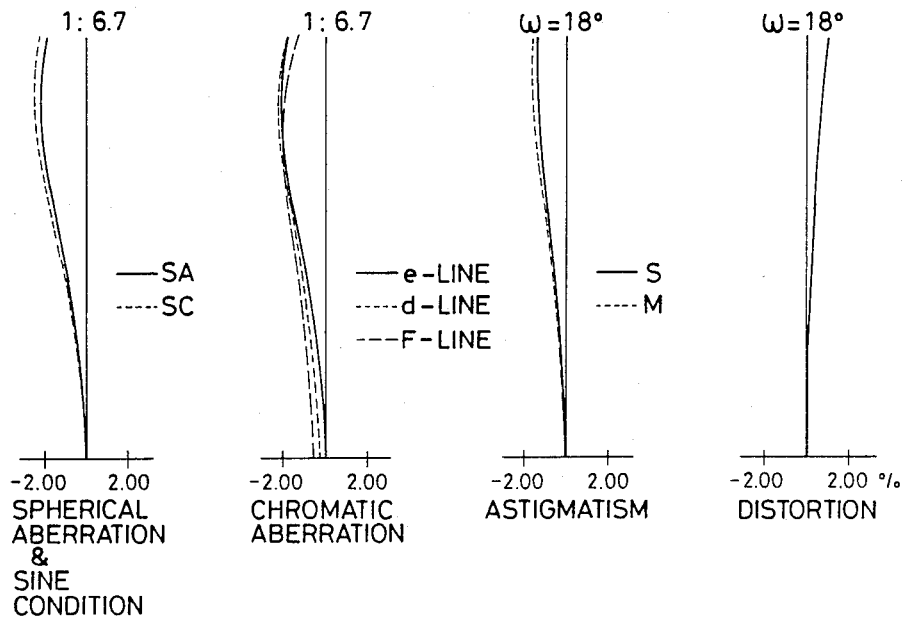
Figure 37:
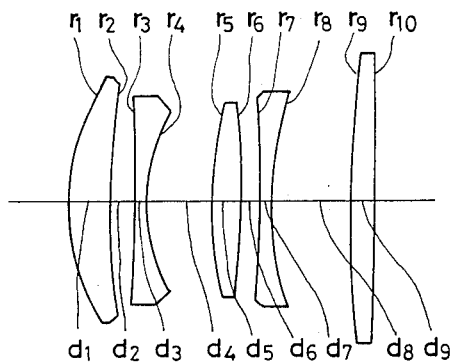
Figure 38:
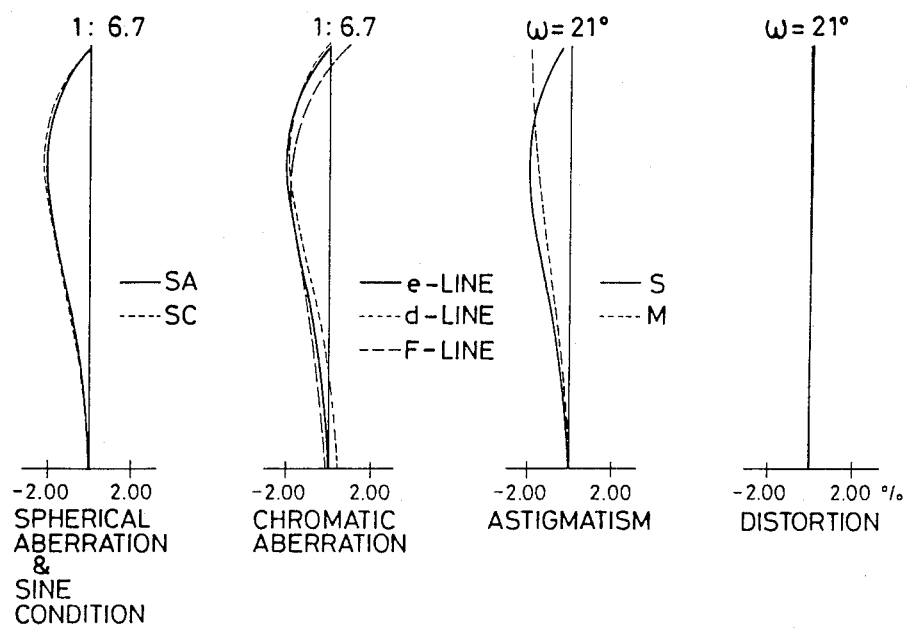
Figure 39:
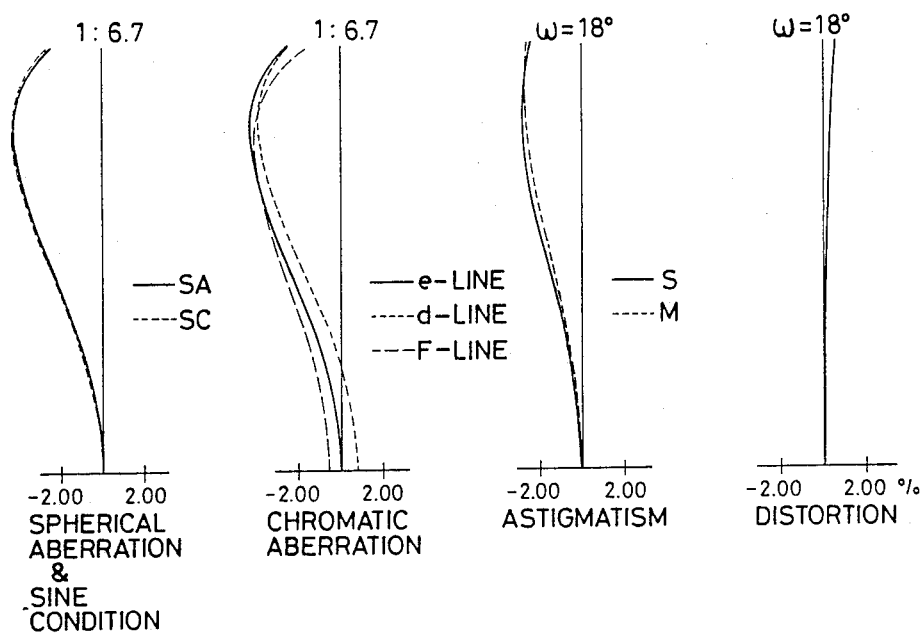
Figure 40:
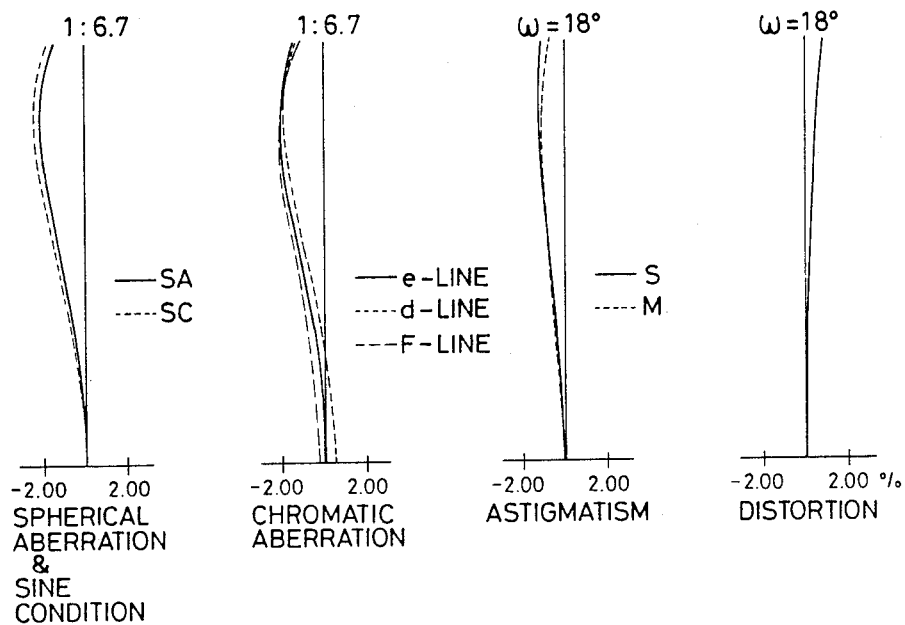
Figure 41:
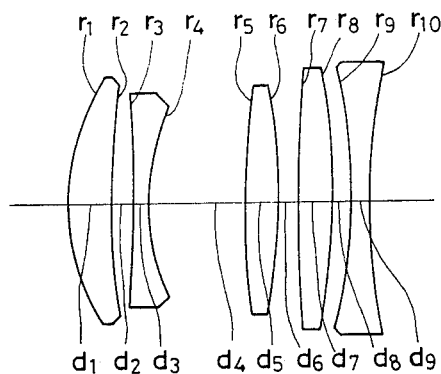
Figure 42:
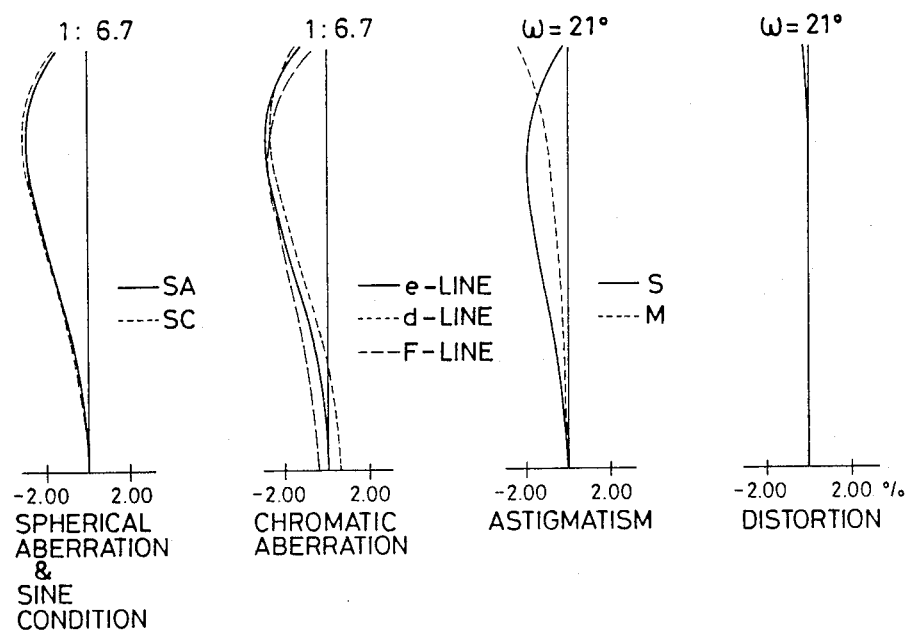
Figure 43:
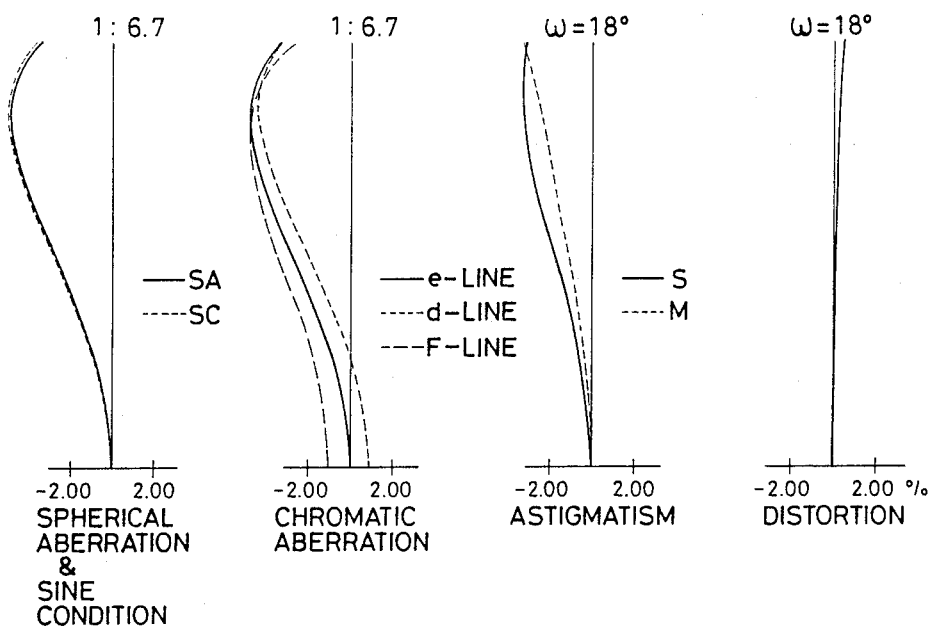
Figure 44:
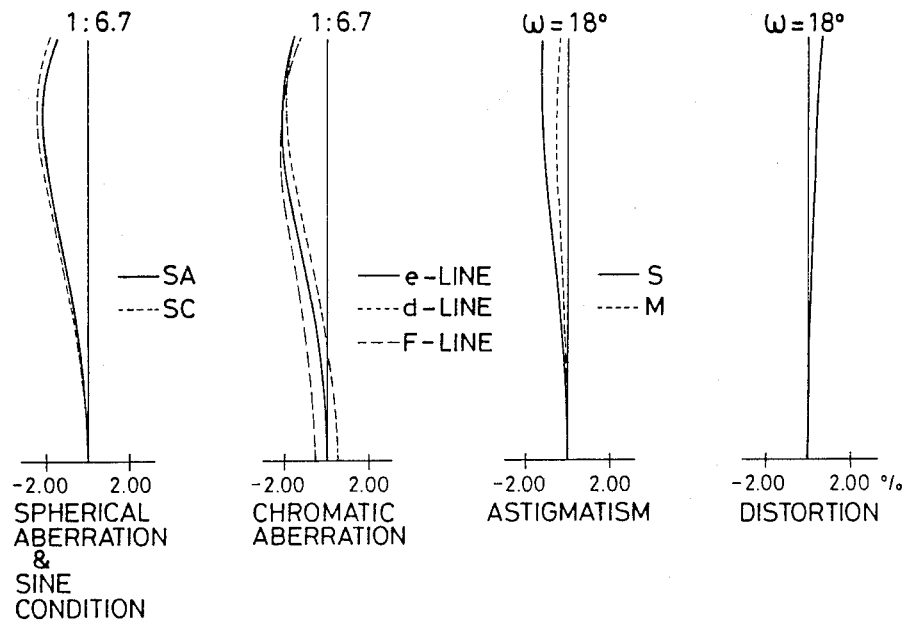
Figure 45:
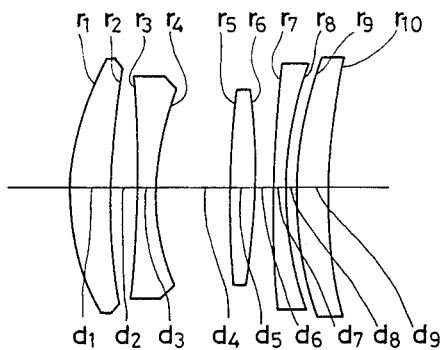
Figure 46:
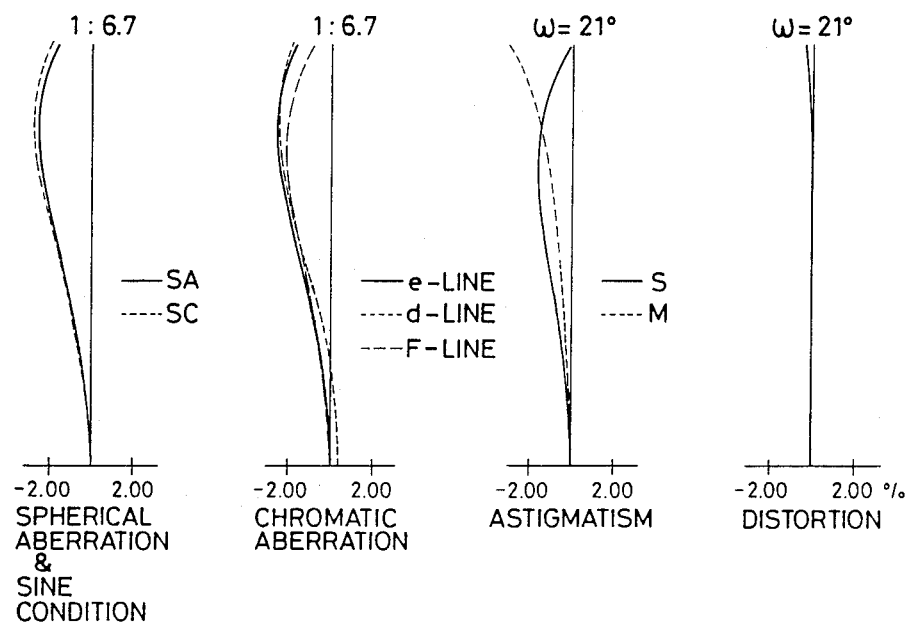
Figure 47:
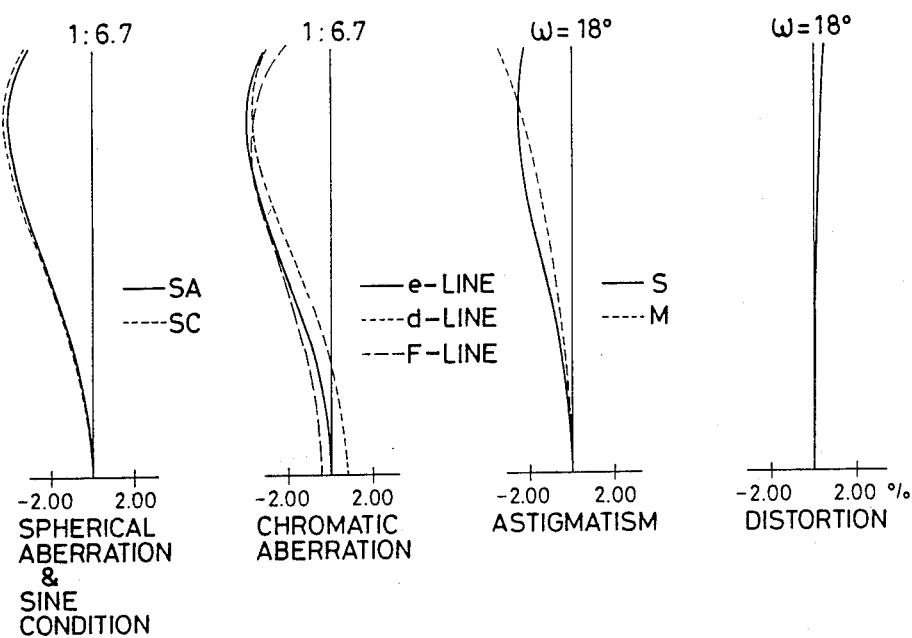
Figure 48:
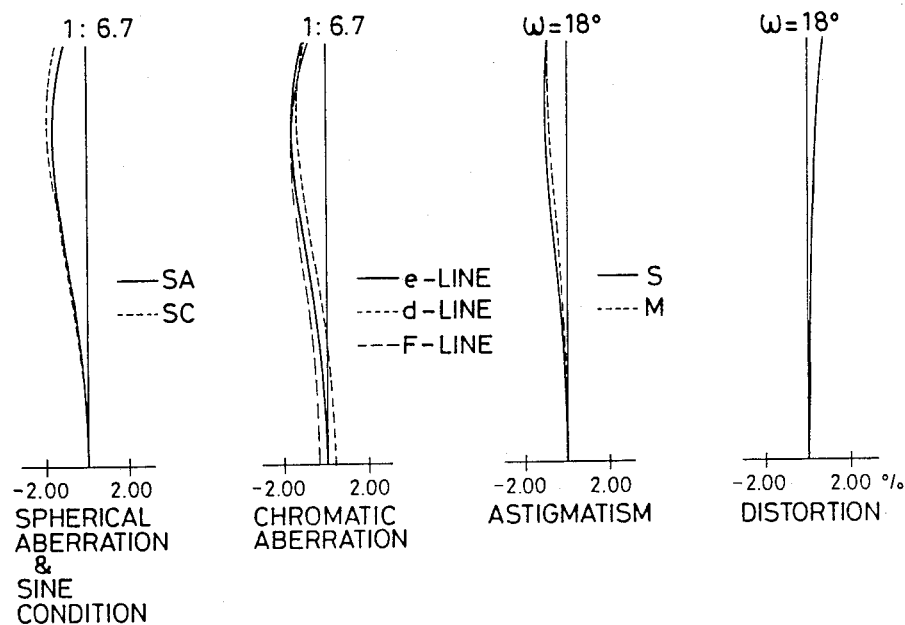
Figure 49:
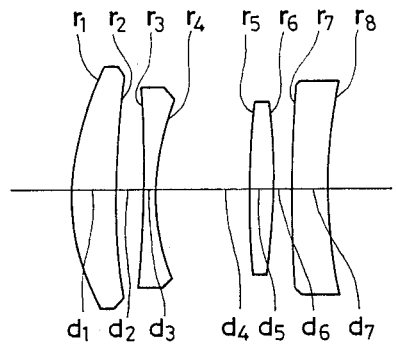
Figure 50:
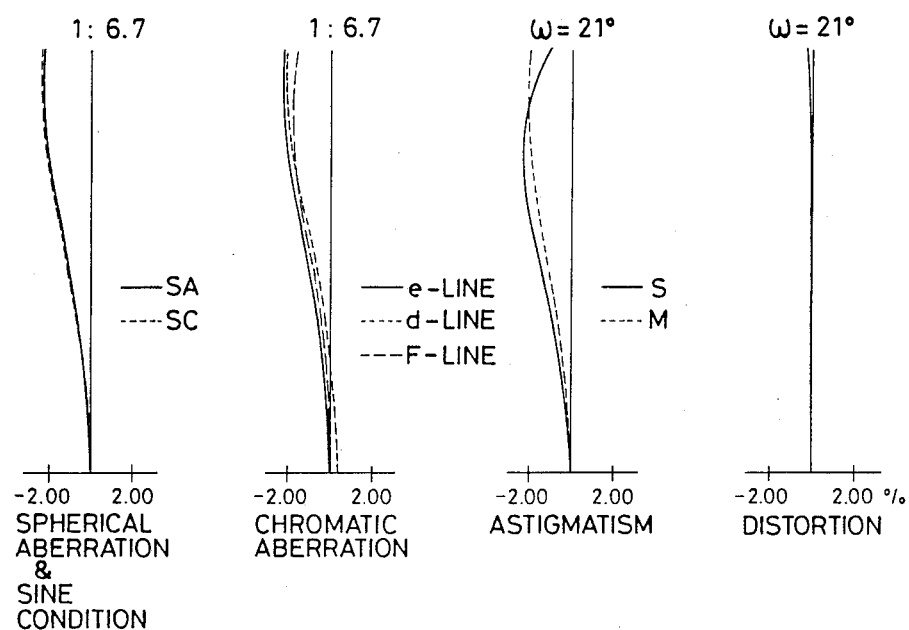
Figure 51:
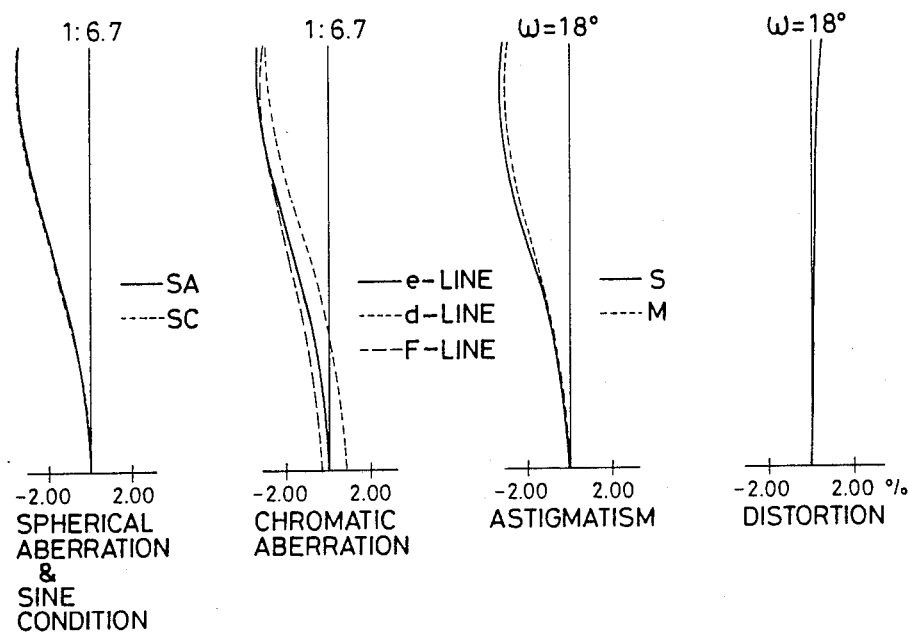
Figure 52:
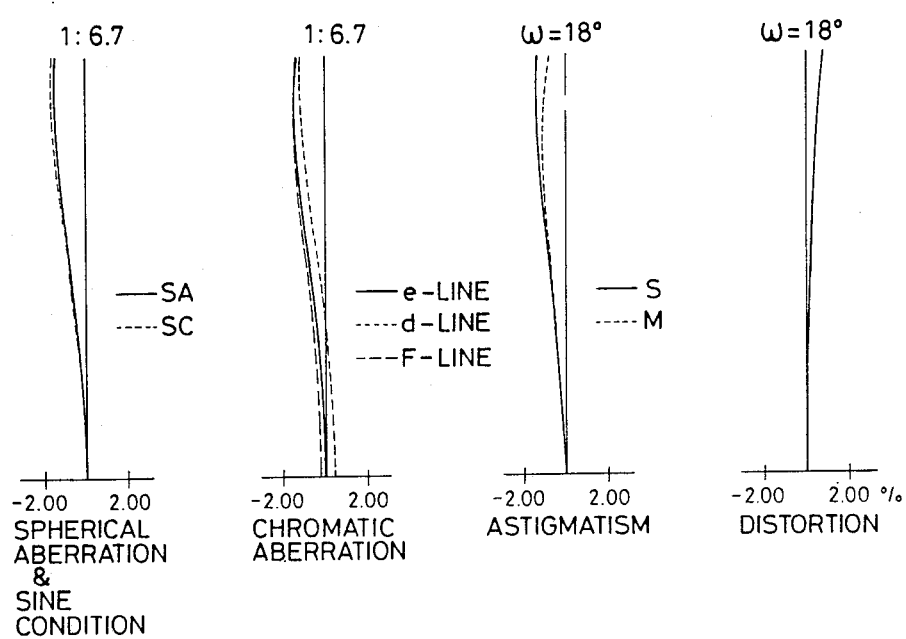
Figure 53:
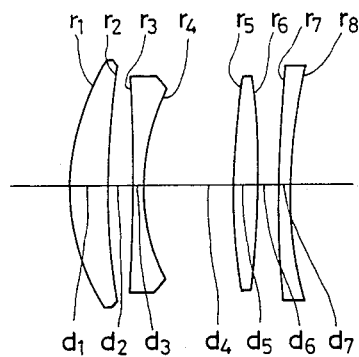
Figure 54:
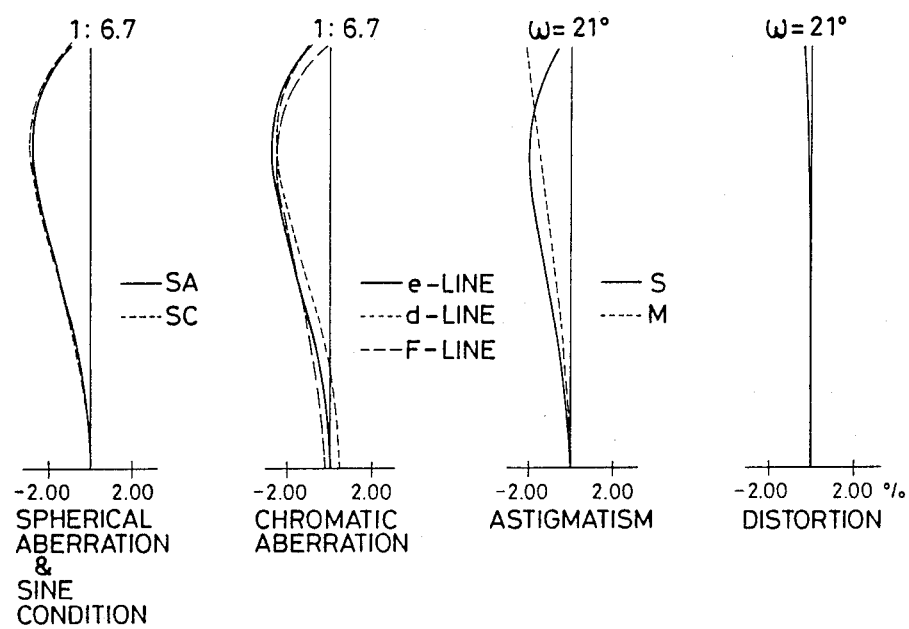
Figure 55:
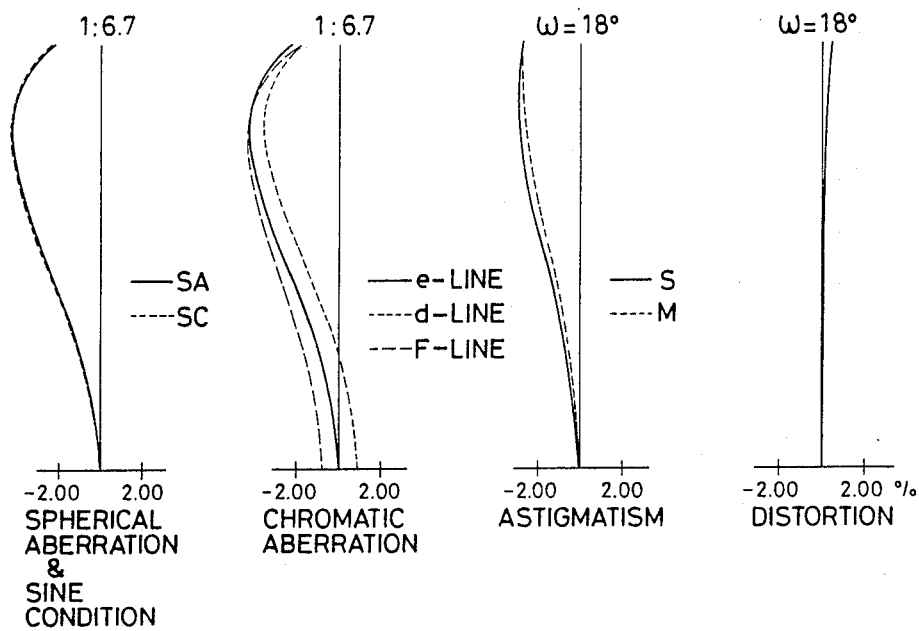
Figure 56:
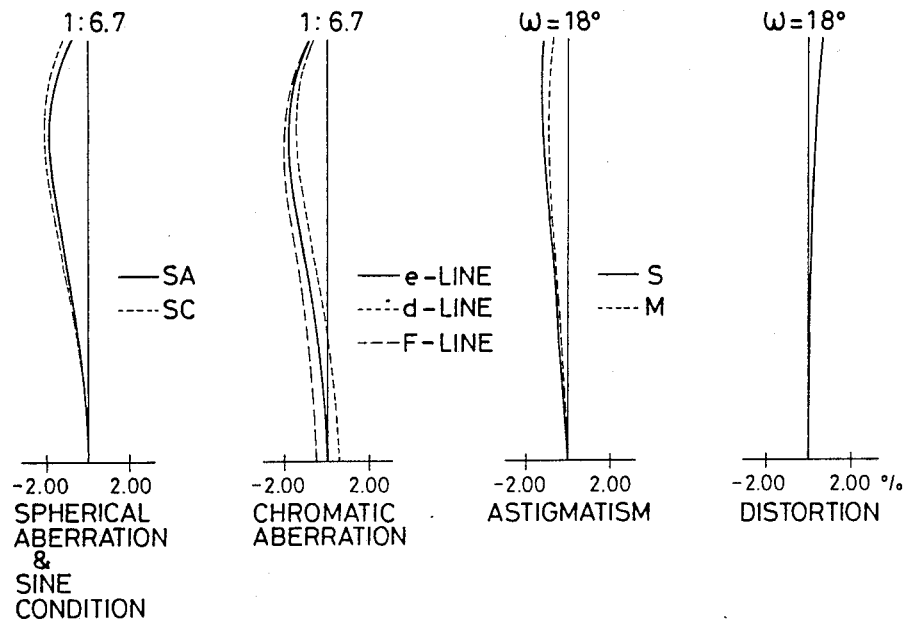
Figure 57:
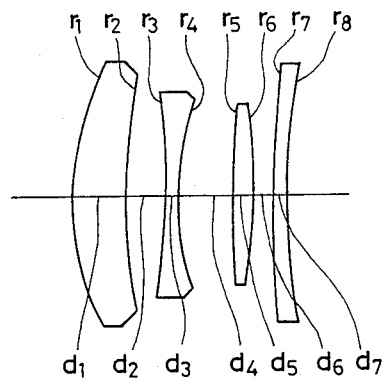
Figure 58:
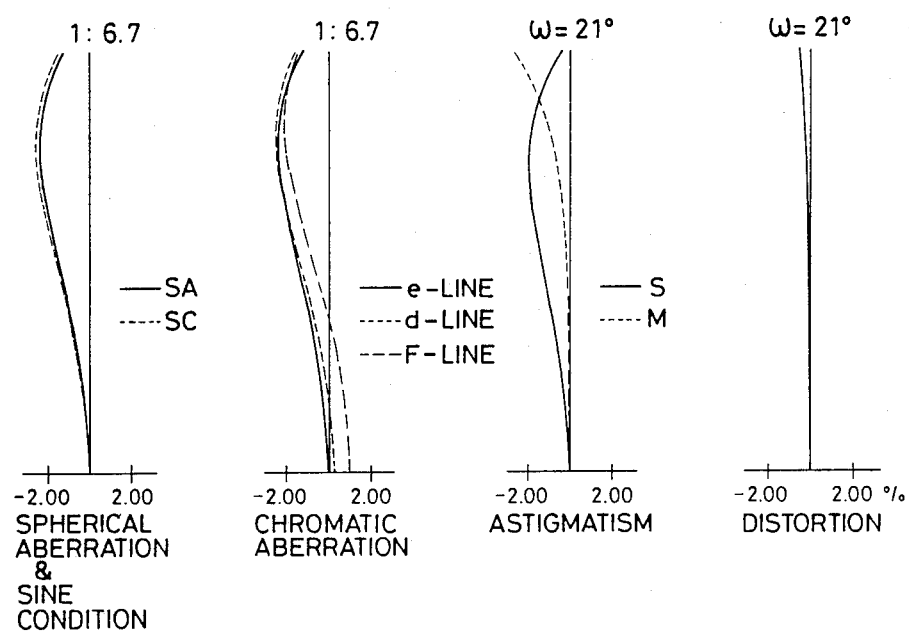
Figure 59:
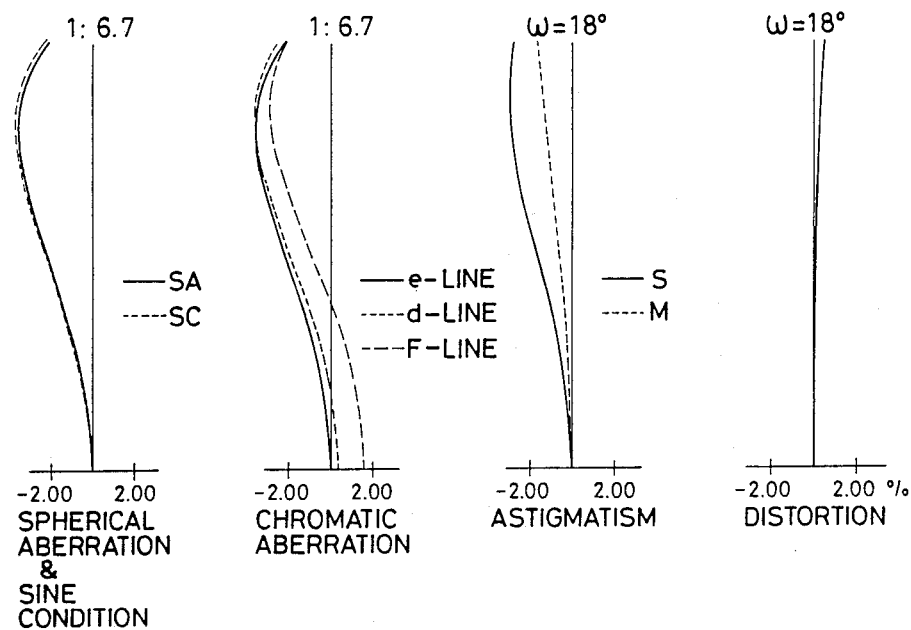
Figure 60:
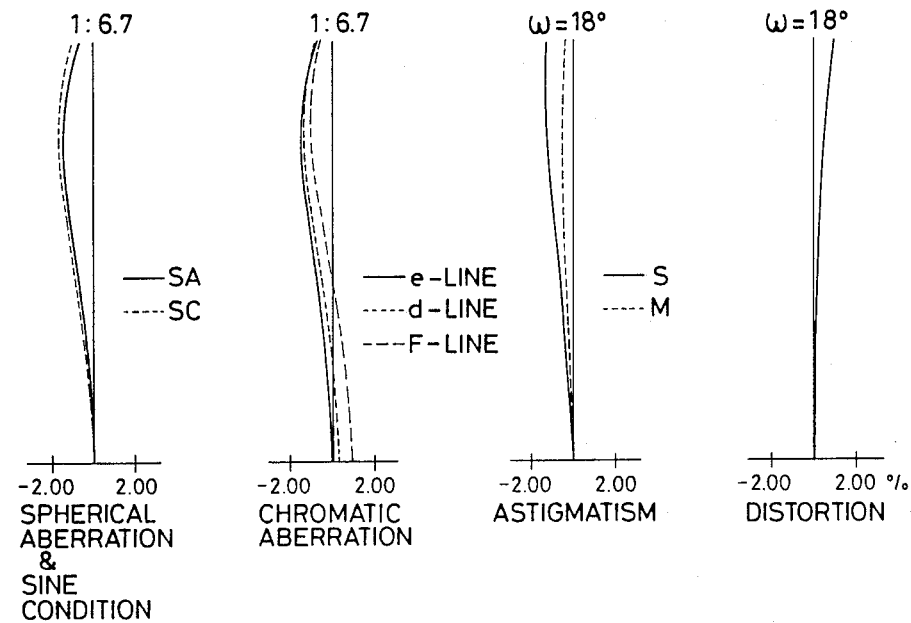
Figure 61:
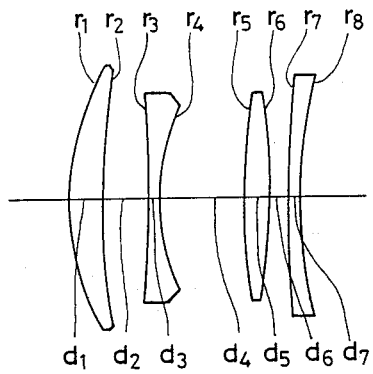
Figure 62:
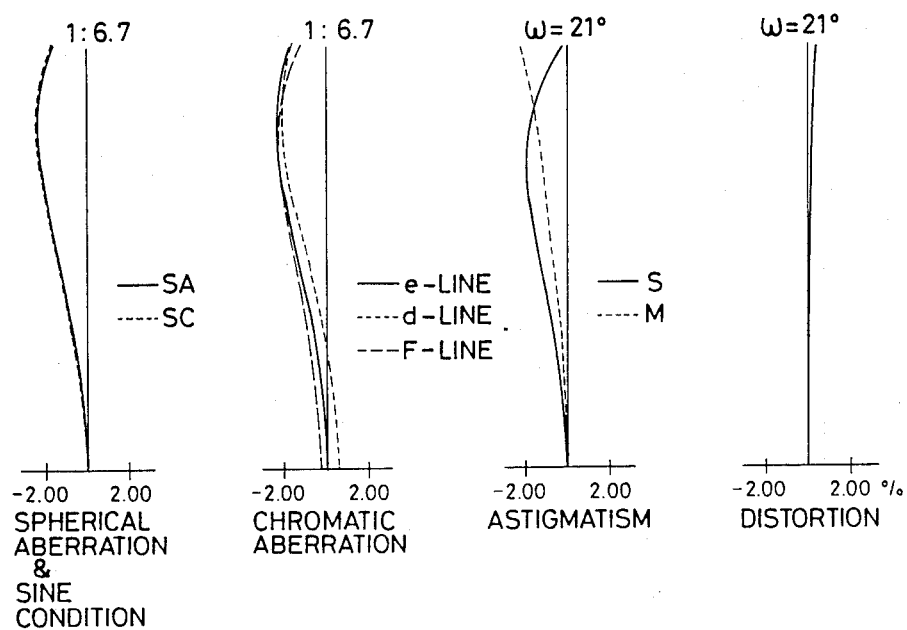
Figure 63:
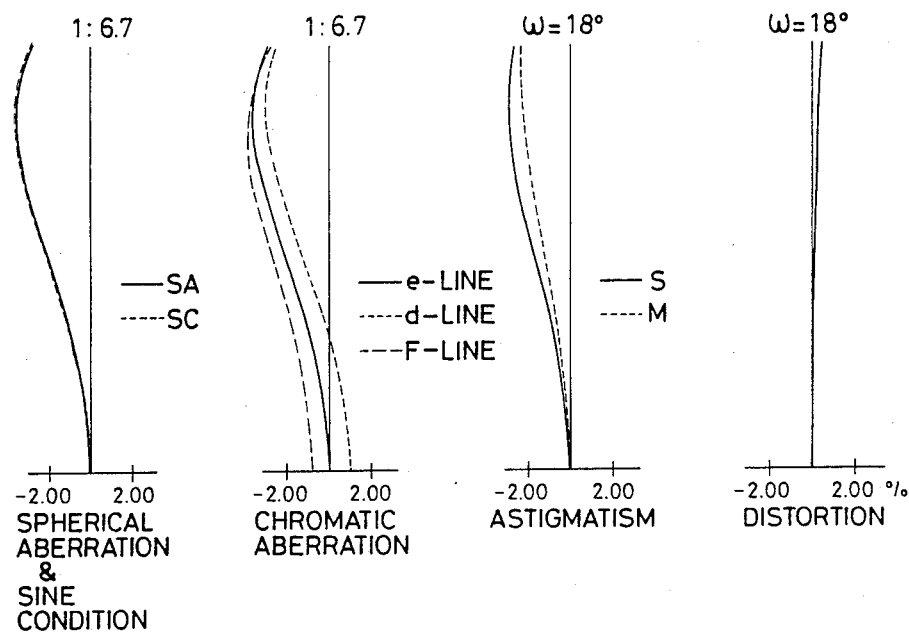
Figure 64:
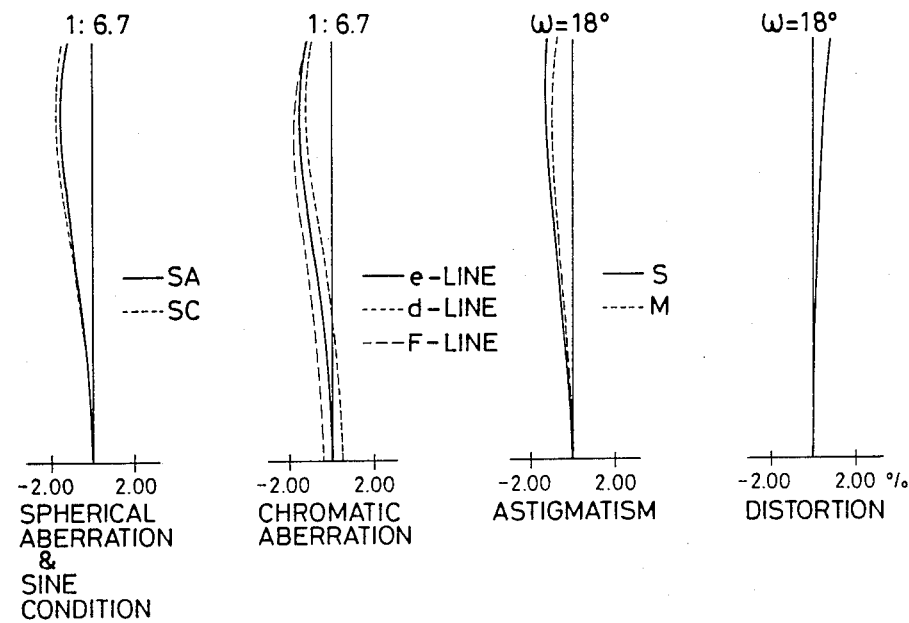
Figure 65:
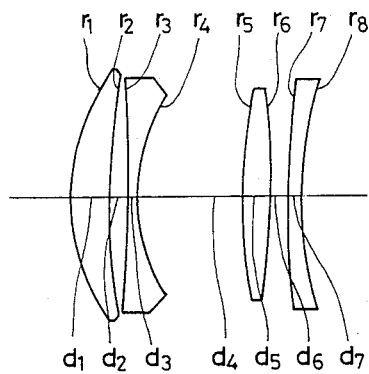
Figure 66:
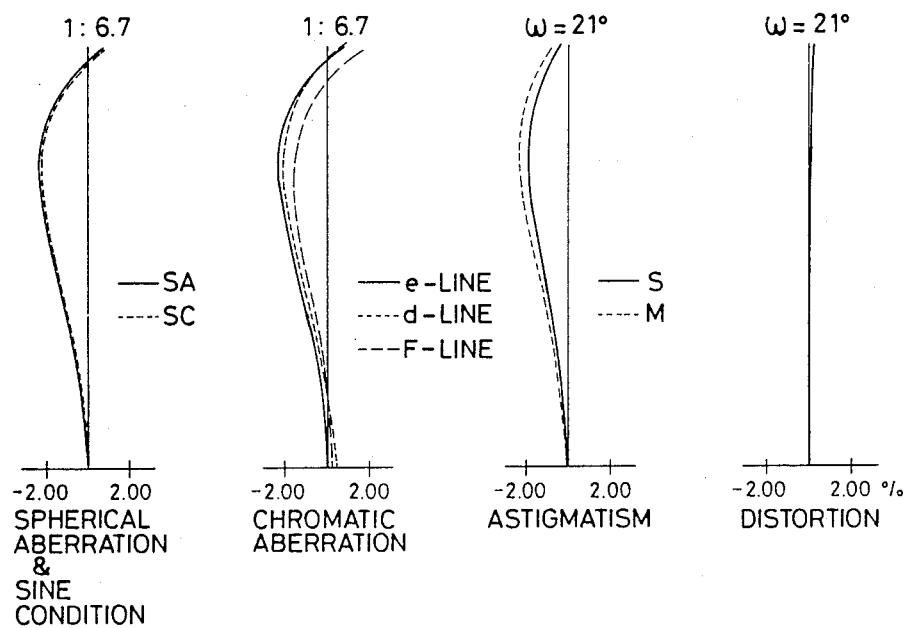
Figure 67:
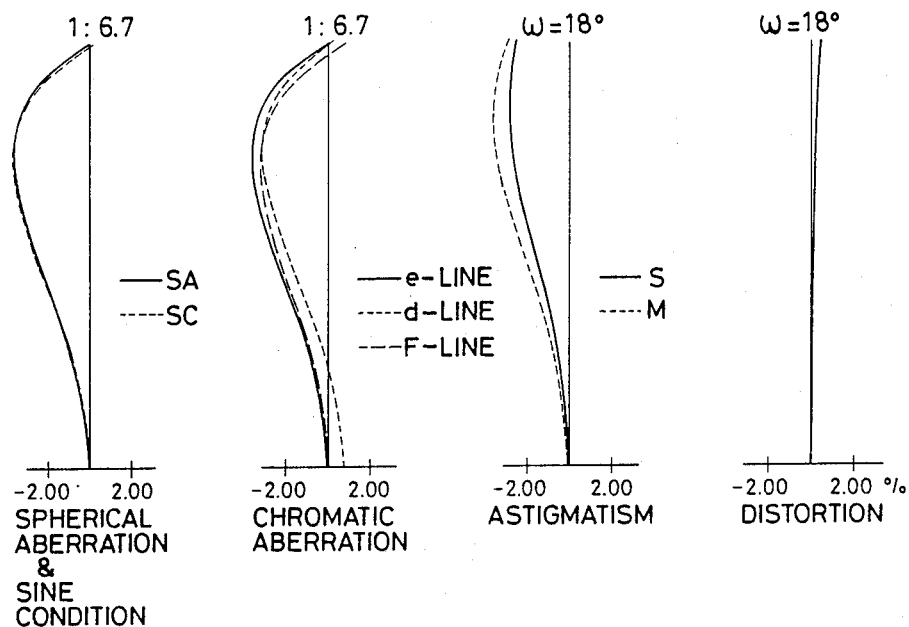
Figure 68:
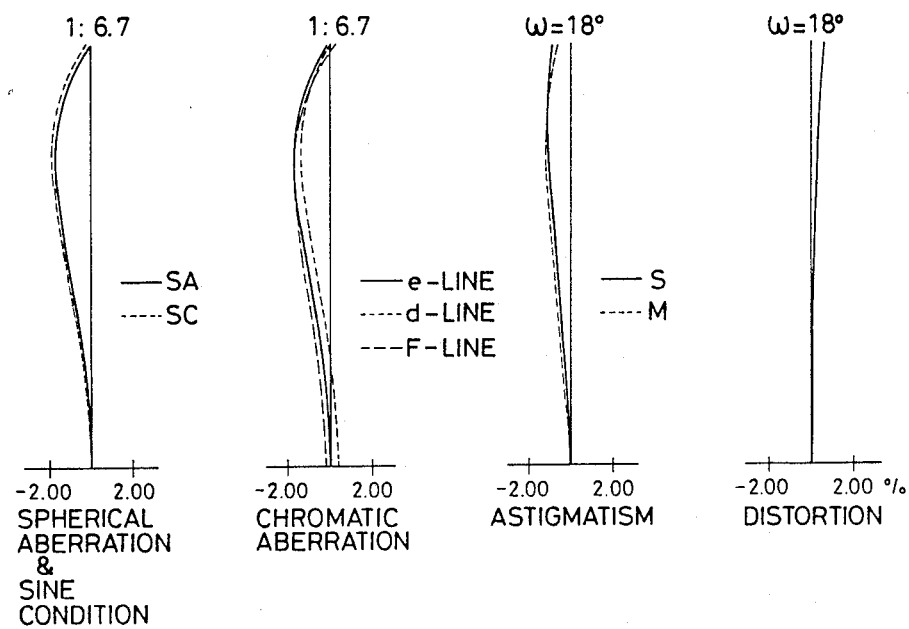
Figure 69:
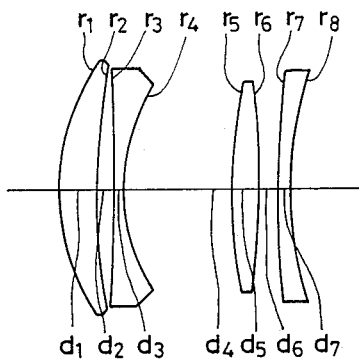
Figure 70:
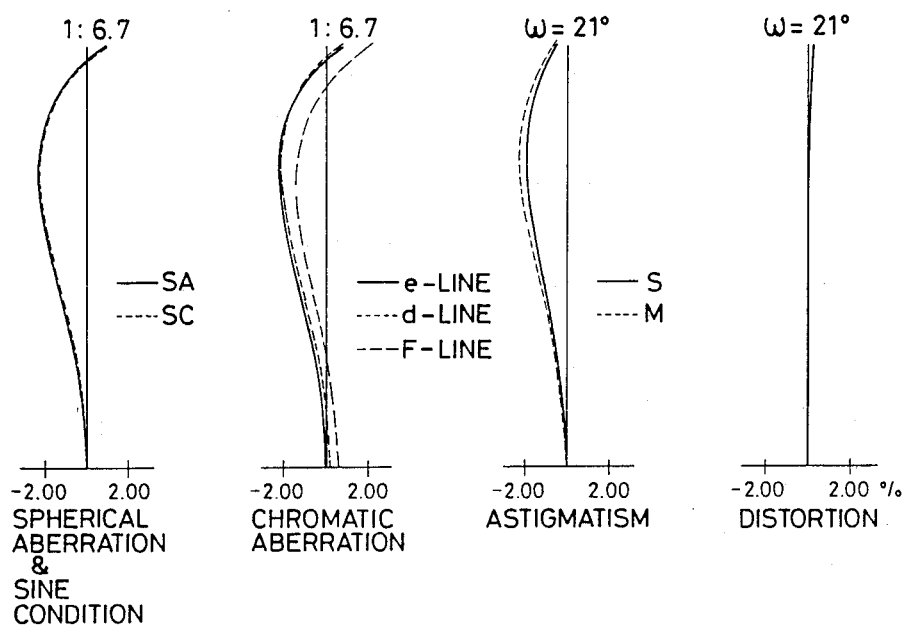
Figure 71:
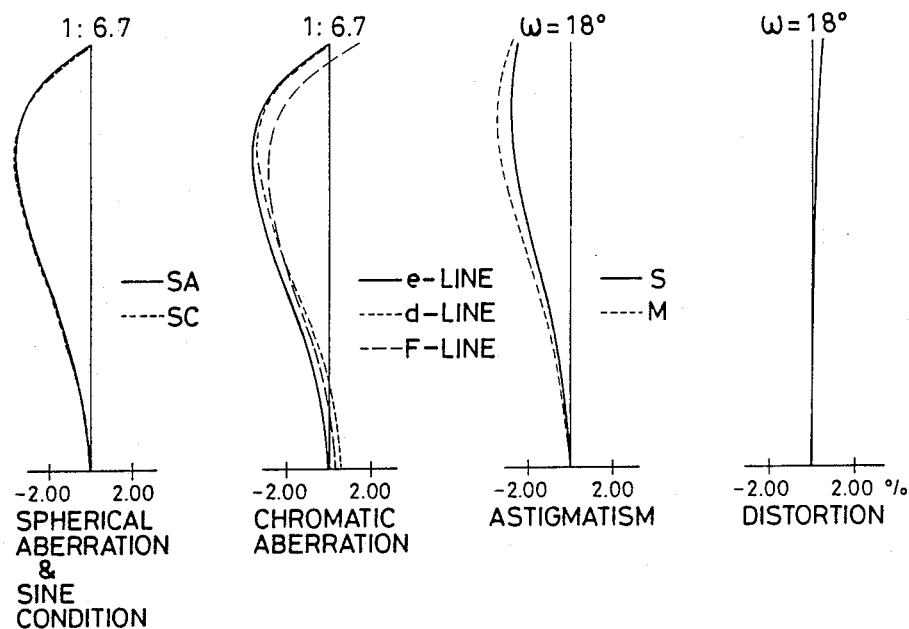
Figure 72:
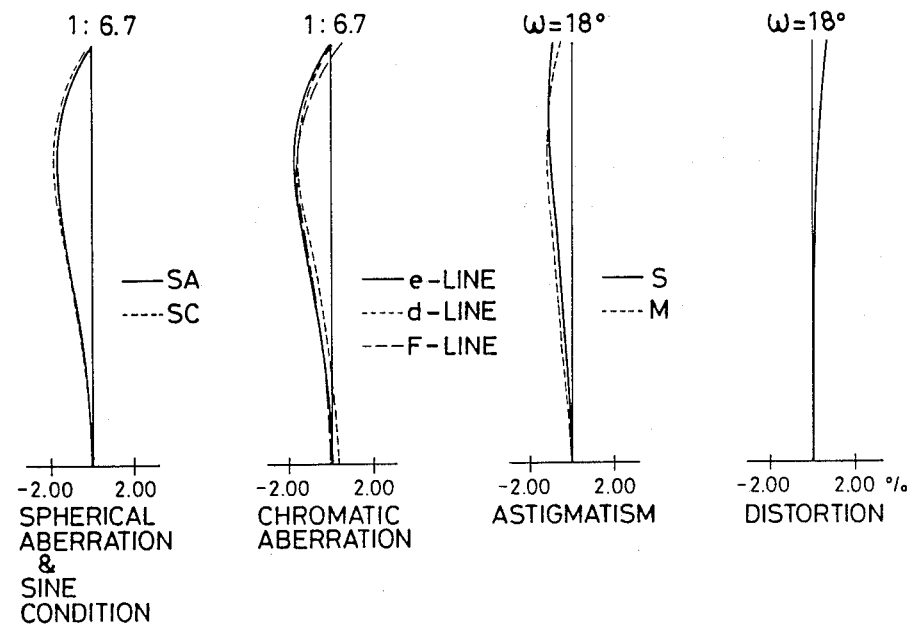
Figure 73:
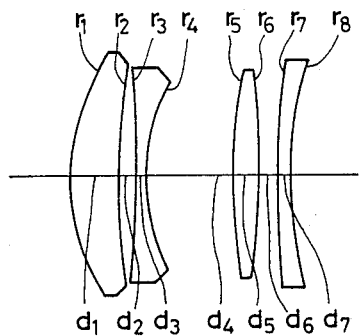
Figure 74:
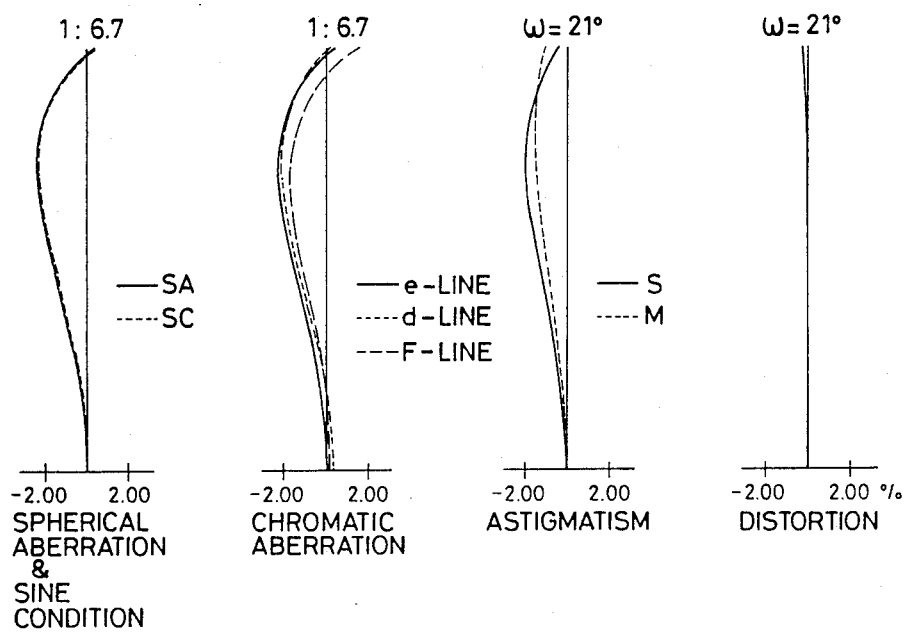
Figure 75:
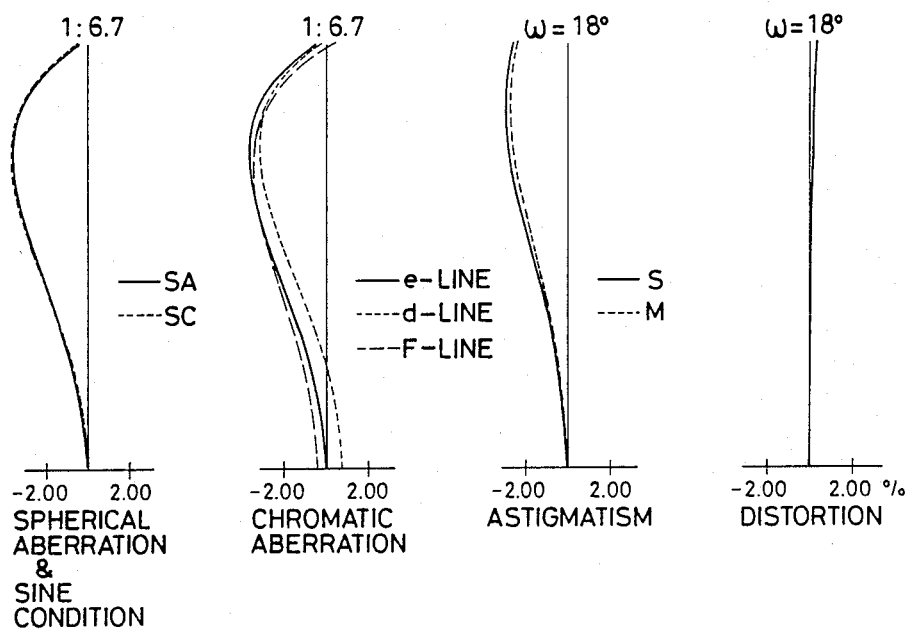
Figure 76:
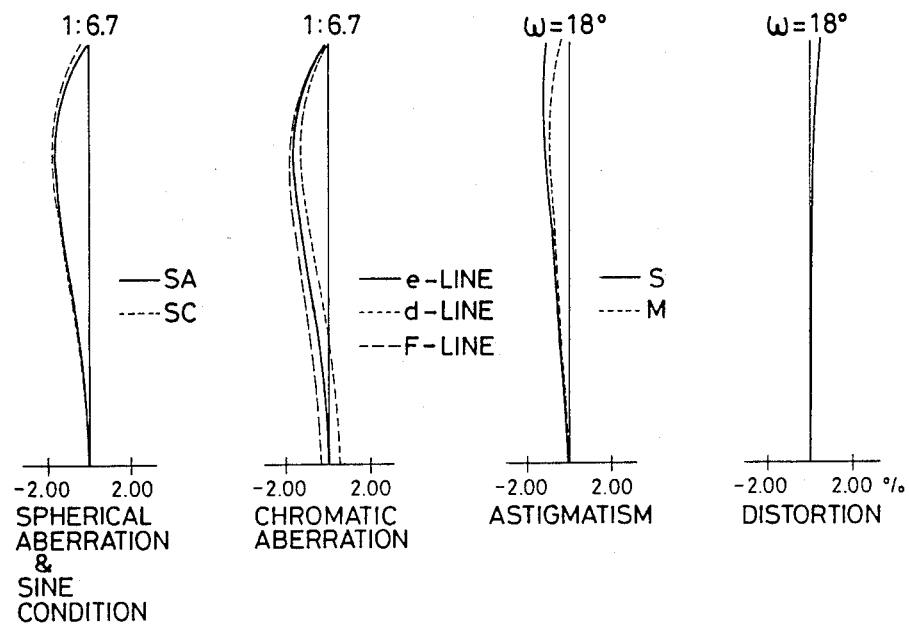

Table 1 summarizes the description of the drawings.

DETAILED DESCRIPTION OF THE PREFERRED EMBODIMENTS

This invention provides a zoom lens, particularly useful for a copying machine. The zoom lens comprises a first lens component on the object side and a second lens component on the side away from the object. The first lens component has a positive focal length while the second lens component has a negative focal length.

The first and second lens components are maintained as separate fixed units but the distance between the units or lens components is changed as the lens components are displaced from each other to effect zooming. However, the distance between the object plane and the image-focusing plane is held constant during zooming.

In the following discussions, the symbols in the conditional formulas have the following definitions:

$f_M$: the focal length of the overall lens system at a magnification of unity;

$f_I$: the focal length of the first lens component;

$f_{II}$: the focal length of the second lens component;

$f_{I,i}$: the focal length of the lens element in the first lens component which is the i-th from the object side;

$f_{II,i}$: the focal length of the i-th lens element in the second lens component;

$n_{I,i}$: the refractive index for the d-line of the lens element in the first lens component which is the i-th from the object side;

$\nu_{I,i}$: the Abbe number for the d-line of the lens element in the first lens component which is the i-th from the object side;

k: the number of the lens elements of which the first lens component is composed;

$r_{II,I}$: the radius of curvature of the first surface of the meniscus lens element of which the second lens component consists; and $\nu_{II,I}$: the Abbe number for the d-line of the first lens element of the second lens component.

In a first preferred embodiment, particularly directed to the first aspect of the invention, the first lens component in the zoom lens is composed of four lens elements, viz., a first positive meniscus lens with its convex surface directed toward the object, a second negative lens, a third negative lens, and a fourth positive lens. Alternatively, the first lens component is composed of three lens elements, viz., a first positive meniscus lens with its convex surface directed toward the object, a second negative lens and a third positive lens. In this embodiment, the second lens component satisfies condition (1)

$$0.7 < -f_{II}/f_M < 3.0 \tag{1}$$

and the first lens component satisfies the following conditions (3) to (7):

$$0.35 < f_I/f_M < 0.85 \tag{3}$$

$$0.3 < f_{I,1}/f_M < 0.6 \tag{4}$$

$$0.15 < f_{I,2}/f_M < 0.45 \tag{5}$$

$$0.001 < \sum_{i=1}^{k} \frac{1}{n_{I,i} \cdot f_{I,i}} < 0.006 \tag{6}$$

$$\left| \sum_{i=1}^{k} \frac{1}{\nu_{I,i} \cdot f_{I,i}} \right| < 0.0001. \tag{7}$$

Note the condition (3) is the same as condition (2) for the other embodiment.

In second preferred embodiment, the second lens component consists of a single negative meniscus lens element and satisfies the following conditions (8) and (9):

$$0.6 < r_{II,1}/f_M < 2.0 \tag{8}$$

$$-0.0002 < \frac{1}{\nu_{II,1} \cdot f_{II}} < 0.0 \tag{9}$$

In a third preferred embodiment particularly directed to the first aspect of the invention, the second lens component in the zoom lens of the present invention satisfies condition (2)

$$0.35 < f_I/f_M < 0.85 \tag{2}$$

and the first lens component further satisfies the following conditions (10) to (13):

$$0.2 < -f_{I,2}/f_M < 0.4 \text{ and } f_{I,2} < 0 \tag{10}$$

$$0.7 < f_{I,1}/f_{I,3} < 2.0 \tag{11}$$

$$0.35 < P_I < 1.3 \tag{12}$$

$$|V_I| < 0.04 \tag{13}$$

in which $$P_I = \sum_{i=1}^{k} f_M/(n_{I,i} \cdot f_{I,i}) \tag{14}$$

$$V_I = \sum_{i=1}^{k} f_M/(\nu_{I,i} \cdot f_{I,i}) \tag{15}$$

In fourth preferred embodiment of the present invention, the zoom lens is so designed that the second lens component is composed of one positive lens element and one negative lens element, or alternatively, it consists of a single negative lens element.

In a fifth preferred embodiment, the zoom lens of the present invention is characterized in that the second lens component satisfies the following conditions (16) and (17):

$$0.6 < -f_{II}/f_M < 3.3 \text{ and } f_{II} < 0 \tag{16}$$

$$-0.06 < V_{II} < 0 \tag{17}$$

in which $$V_{II} = \left( \frac{1}{\nu_{II,1} \cdot f_{II,1}} + \frac{1}{\nu_{II,2} \cdot f_{II,2}} \right) \times f_M. \tag{18}$$

Condition (16) is wider than condition (1). In any of the embodiments shown above, the object plane and the image-focusing plane may be reversed in order.

The importance of the various conditions in the different embodiments will now be described.

In the prior art zoom lens for use in copying, the first lens group is composed of four to six lens elements and the second lens component, which is to be displaced during zooming, consists of two lens elements one being positive and the other negative. The most characteristic feature of the zoom lens of the first two embodiments of the present invention is that it has attained a simpler design by using only one negative mensicus lens element in the second lens component.

Conditions (1), (3)–(9) shown above are hereinafter described in detail.

Condition (1) relates to the ratio of the focal length of the single negative miniscus lens of the second lens component as compared to the focal length of the overall system. The principal function of the second lens component is to prevent any aberrations from increasing after they have been effectively compensated within the first lens component. To this end, the distance between the first and second lens components is adjusted to vary the focal length of the overall system so that the distance between the object plane and the image-focusing plane is held constant. If the upper limit of condition (1) is exceeded, the power of the second lens component is decreased in a manner which is advantageous for the purpose of minimizing the aberrational variation that may occur during zooming. However, this is not desirable for the purpose of size reduction since the distance over which the second lens component is displaced during zooming is increased. On the other hand, if the lower limit of condition (1) is not achieved, the power of the second lens component is increased so that it suffices to be displaced by a smaller distance during zooming. However, the sensitivity of the second lens component is increased during zooming and it is particularly difficult to fabricate a second lens component of good performance since it is to be displaced during zooming.

In the first and second embodiments of the present invention, the second lens component consists of a single lens element and great difficulty is encountered in successfully compensating in the second lens component any aberration that may have been left unremoved in the first lens component. Therefore, it is desirable that any aberrations which develop during zooming are effectively compensated within the first lens component. In order to attain this end, formulas (3) to (7) specify the conditions for appropriatey distributing the power of individual lens elements within the first lens component and for attaining two important parameters for the copying lens, namely, the flatness of an image plane and compensation of chromatic and other aberrations in a balanced manner.

Condition (3) relates to the ratio of the focal length of the first lens component to that of the overall system. If the upper limit of condition (3) is exceeded, the power of the first lens component is reduced such as to facilitate effective compensation of aberrations within the first lens component. But, at the same time, the amount of displacement of the second lens component during zooming is increased to an undesirable distance. If the lower limit of condition (3) is not satisfied, the power of the first lens component is so much increased that not only does it become difficult to realize effective aberrational compensation solely within the first lens component but great aberrational variations will also occur during zooming.

Condition (4) relates to the power of the first positive lens element which is the closer to the object of the two positive lens elements in the first lens component. This condition should be satisfied in order to appropriately distribute the large positive power of the first lens component between the two positive lens elements. If condition (4) is not satisfied, the power is unevenly distributed and one of the two positive lens elements is required to sustain the greater part of that power. However, this causes difficulty in providing effective compensation of spherical aberration and astigmatism.

Condition (5) relates to the power of the second negative lens element in the first lens component. If the upper limit of condition (5) is exceeded, the power of this second lens element is not reduced in a manner which is favorable to the compensation of a chromatic aberration. If the lower limit of (5) is not satisfied, the power of the second lens element becomes excessive and each of the lens elements in the first lens component has a decreased radius of curvature which is too small to effectively prevent coma aberration.

Condition (6) relates to the Petzval sum of the first lens component. More specifically, it shows the condition for effectively compensating the Petzval sum in the first lens component in order to attain a flat image plane over a wide range of view angles, which is one of the important characteristics of a copying lens. If the upper limit of (6) is exceeded, the Petzval sum of the first lens component becomes excessive and a flat image plane will not be obtained. If the lower limit of (6) is not achieved, each of the lens elements in the first lens component must have an increased power and difficulty is involved in performing effective compensation of such aberrations as spherical and coma aberrations.

Condition (7) relates to the compensation of chromatic aberration within the first lens component. Since the second lens component consists of a single lens element in these embodiments, any chromatic aberration that will occur within the first lens component must be thoroughly compensated therein in order to minimize the possible variation in chromatic aberration during zooming. If the condition (7) is not met, an excessively great chromatic aberration will occur within the first lens component and an undesirably large variation in chromatic aberration will take place during zooming.

Condition (8) relates to the radius of curvature of the negative mensicus lens element of which the second lens component consists. If the radius of curvature of the first surface (the surface on the object side) of the negative meniscus lens element is within the limits specified by condition (8), zooming can be effected by changing the focal length of the overall system, with the distance between the object plane and the iamge-focusing plane being held constant, without increasing the aberrations that have been appropriately compensated within the first lens component. If condition (8) is not met, great aberrational variations will occur during zooming and the increase in astigmatism is particularly pronounced.

Condition (9) relates to chromatic aberration which should not occur within the second lens component. In accordance with the first two embodiments of the present invention, the second lens component consists of a single lens element and it is impossible to attain effective compensation of chromatic aberration in the second lens component. Therefore, the possibility of chromatic aberration occurring in the second lens component should be reduced to a minimum level. Therefore, if condition (9) is met, the chromatic aberration that has been appropriately compensated wihin the first lens component can be maintained at the desirable low level without increasing its intensity during zooming.

As described in the foregoing, the zoom lens of the present invention has an asymmetric lens configuration in that the first lens component has a positive power while the second lens component has a weak negative power. This configuration allows a longer distance to be provided between the object plane and the lens surface than between the lens surface and the image-focusing plane and will offer a particular advantage when a large space is needed in front of the lens surface. If the object plane and the image-focusing plane are reversed in order, it becomes possible to provide a large space behind the lens surface.

The prior art zoom lens for use in copying is composed of at least six lens elements in six units but, as shown in the foregoing pages, the system of the present invention is composed of either five lens elements in five units or four elements in four units, and the second lens component in some of the embodiments consists of only one negative mensicus lens element. Because of this great simplicity in design, the zoom lens of the present invention has satisfactorily attained its objective, viz., reduction in size and cost. In addition, the zoom lens of the present invention satisfies specifications equivalent to those of an illustrative prior art system composed of eight lens elements in eight units or seven elements in seven units, and yet attains a brightness comparable to that of such prior art system.

Turning now to the third through fifth embodiments, the construction of the zoom lens of the present invention is hereunder described with particular reference being made to the conditions (2) and (10)–(13), (16) and (17).

According to the most characteristic feature of the last three embodiments of the present invention, the first lens component is the principal component of a zoom lens for use in copying. As mentioned previously, the first lens component is conventionally composed of at least 4 to 6 lens elements and is made up of a minimum number of lens elements. At a minimum, the first lens component is composed of three elements each forming one unit. From the viewpoint of minimizing the number of lens elements used in the first lens component, the ratio of the focal length of the first lens component to that of the overall system is an important design consideration. This ratio should be within the limits defined by condition (2). If the upper limit of condition (2) is exceeded, the power of the first lens component is reduced in a manner which is advantageous for the purpose of compensation of aberrations. However, this is not desirable for the purpose of size reduction since the distance between the first and second lens components that has to be changed during zooming is increased. On the other hand, if the lower limit of condition (2) is not satisfied, the power of the first lens component becomes excessive and, as compared with the compensation of the aberrations in the overall system, the weight of the compensation of aberrations in the second lens component is increased to such as extnt that great aberrational variations will occur during zooming. In addition, the individual lens elements are so sensitive to any errors which may be encountered during system fabrication that the desired lens performance cannot be ensured.

If the positive first lens component satisfies the additional conditions (10) to (13), the lens power can be appropriately distributed within the first lens component. Also, two important parameters for the copying lens, namely the flatness of an image plane and effective compensation of chromatic and other aberrations, can be attained.

Condition (10) relates to the power of the second negative lens element in the first lens component. If the upper limit of condition (10) is exceeded, the negative power of the second lens element is decreased, allowing the first and third lens elements to have a decreased positive power. This is advantageous for the purpose of compensating spherical and coma aberrations but causes difficulty in compensation of a chromatic aberration. If, on the other hand, the lower limit of condition (10) is not reached, the power of each of the lens elements in the first lens component becomes excessively, leading to the occurrence of an extremely great coma aberration and reduction in MTF (modulation transfer function) at low frequency which is one of the important parameters for copying lenses.

Condition (11) must be satisfied in order to realize effective compensation of aberrations by distributing the great positive power of the first lens component between the first and third lens elements. If the upper limit of condition (11) is exceeded, the positive power of the first lens element becomes excessively small and difficulty is involved in effecting satisfactory compensation of the spherical aberration and astigmatism which may develop at each of the surfaces of the second lens element. If the lower limit of condition (11) is not reached, the positive power of the first lens becomes excessive and the asymmetric nature of the lens system is increased to produce greater distortion. In addition, the spherical aberration occurring at the first surface of the first lens element is too pronounced to be effectively compensated.

Condition (12) relates to the compensation of the Petzval sum within the first lens component. As already mentioned, the first lens component is the dominant factor in aberrational compensation and compensation of its Petzval sum is important for the purpose of allowing a copying lens to provide good performance over a wide range of viewing angles. If the upper limit of condition (12) is exceeded, the Petzval sum of the first lens component becomes excessively great and difficulty is encountered in providing a flat image plane. If the lower limit of condition (4) is not satisfied, the positive first and third lens elements must be formed of an optical material having high refractive index and low dispersion but this requirement runs against the requirement for low cost. In addition, the power of individual lens elements is increased to such an extent that they will become excessively sensitive to any errors which may be introduced during system fabrication, and problems such as the production of a deteriorated system will occur.

Condition (13) relates to the compensation of chromatic aberration within the first lens component. In order to ensure that a zoom lens of the type contemplated by the present invention provides good performance during zooming, chromatic aberration must be compensated to some extent for each lens component. Condition (13) is particularly important for this purpose since the first lens component is the dominant factor in aberrational compensation. If the upper limit of condition (13) is exceeded, excessive chromatic aberration will occur in the first lens component and it becomes difficult to attain good lens performance over a broad range of zooming ratios because even if the chromatic aberration occurring in the first lens component is compensated to some extent within the second lens component, it will experience an unavoidable change during zooming.

In the following pages, the second lens component is described. The principal function of the second lens component is to compensate for any change that occurs in the object-to-image distance during zooming so that the distance will remain constant after zooming. The second lens component has the auxiliary function of compensating for the small residual aberration in the first lens component such that it is reduced to the final desirable level. Therefore, compared with the first lens component, the second lens component may be configured to have a small negative power and be composed of fewer lens elements.

In the third through fifth embodiments of present invention, the second lens component is composed of one positive lens element and one negative lens element or, alternatively, it consists of a single negative lens element.

The conditions which are desirably satisfied by the second lens component used in the present invention are described below.

Condition (16) relates to the power of the overall second lens component. The negative power of the second lens component is related not only to the positive power of the first lens component but also to the distance between the first and second lens components. The negative power of the second lens component is important for the purpose of providing a zoom lens system which is compact and effectively compensates aberrations over a broad range of zooming ratios. If the upper limit of condition (16) is exceeded, the power of the second lens components is decreased and the aberrational variation which may occur during zooming can be reduced to a small level. However, the distance between the two lens components will vary greatly during zooming and a compact lens system cannot be attained. If, on the other hand, the lower limit of condition (16) is not satisfied, the change tht will occur in the distance between the two lens components is decreased and a compact system can be produced. However, aberrations such as spherical and chromatic aberrations will vary greatly during zooming and its becomes difficult to attain good lens performance over a broad range of zooming ratios.

Conditions (17) relates to the compensation of chromatic aberration in the second lens components. Since the second lens components has a negtive power as a whole, the value defined by condition (17) is usually negative. If the lower limit of (17) is not reached, the chromatic aberration occurring in the second lens components is overcompensated and, even if the chromatic aberration is compensated for a given magnification, it will unavoidably vary during zooming. If the second lens component consists of only one lens element, $f_{II,2}$ can be considered to be infinite and condition (17) can be expressed as:

$$v_{II} = \frac{1}{v_{II,1} \cdot f_{II,1}} \times f_M. \tag{17'}$$

If the second lens component satisfies the requirements of conditions (16) and (17), effective aberrational compensation can be effected irrespective of whether the component consists, in order from the object side, of a positive lens element and a negative element, or a negative lens element and a positive lens element (see the Examples that will follow). If a symmetrical lens system is desired, it is advantageous for the purpose of attaining effective aberrational compensation that the second lens component which follows the first lens component consists, in order from the object side, of a negative lens element and a positive lens element.

The second lens component may alternatively consist of a single negative lens element and, as will be apparent from the Examples that will follow, the resulting lens system is capable of zooming over a wide range with the aberrations being reduced to practically acceptable low levels. It should however be noted that as compared with the case where the second lens component is composed of one positive lens element and one negative lens element, the lens system wherein the second lens component consists of a single negative lens element will unavoidably experience slightly increased variations in axial and transverse chromatic aberrations due to magnification.

With the configuration described above, the zoom lens for copying of the present invention is compact in size, inexpensive and ensures good performance over a broad range of zooming ratios. Even better performance can be attained by configuring the first lens component such that it additionally satisfies the following conditions:

$$0.7 < r_1/r_4 < 1.4 \tag{18A}$$

$$0.7 > d_4/d_2 < 10 \tag{19}$$

$$0.4 < |r_5/r_6| < 2 \text{ and } r_6 < 0 \tag{20}$$

Condition (18A) specifies the requirement for effective compensation of spherical aberration. The first surface of the first lens element ($r_1$) and the second surface of the second lens element ($r_4$) have a tendency to have a large coefficient of spherical aberration and the spherical aberration can be reduced to a small level by relating $r_1$ and $r_4$ in the manner shown by condition (18A). If the upper limit of condition (18A) is exceeded, the spherical aberration will be overcompensated to an extreme degree, and if the lower limit of condition (18A) is not reached an extreme undercompensation of spherical aberration will occur.

Condition (19) specifies the relative axial position of triplet lenses in the first lens component. If the upper limit of condition (19) is exceeded, the curvature of field of the meridional image plane for a marginal viewing angle will be undercompensated. If the lower limit of (19) is not reached, the curvature parameter will be overcompensated and large spherical and coma aberrations will occur.

Condition (20) specifies the shape of the third lens element. Both surfaces of the third lens element ($r_5$ and $r_6$) also have a strong positive power and a balance must be struck between the radii of curvatures of the two surfaces in order to compensate for the aberrations that have occurred in the first and second lens elements. If condition (20) is not satisfied, difficulty is encountered in effecting balanced compensation of spherical and coma aberrations.

If the negative second lens component consists of a single lens element, highly effective aberrational compensation can be accomplished by satisfying the following condition:

$$0.3 < f_M/r_7 < 2 \tag{21}$$

If condition (21) is not met, increased coma aberration and astigmatism occur, and these aberrations wil change greatly during zooming.

As described in the foregoing pages, the zoom lens of the present invention consists of two lens components, the first one having a positive power and the second one having a small negative power. Because of this arrangement, the lens system can be incorporated in a copying machine with a longer distance being provided between the object plane (the surface of the original) and the lens surface than the distance between the lens surface and the image-focusing plane (the surface of the photoreceptor). This is advantageous in the case where the space for accommodating a scanning mirror must be provided between the object plane (the surface of the original) and the lens surface, or where similar results are desired in view of the layout of the copying machine.

In addition, since the object plane and the image-focusing plane are conjugate planes, it is of course within the scope of the present invention to reverse the order of these planes. In this case, the distance between the image-focusing plane and the lens surface can be made longer than that between the lens surface and the object plane, thereby providing a greater degree of freedom in the layout of the copying machine.

Numerical data of several specific embodiments of the present invention are given hereinafter, wherein $F_{NO}$ signifies the F number, $f_M$ is the focal length of the overall lens system at a magnification of unity (1.00X), $\omega$ is half of the viewing angle, m is the magnification or zooming range (in the tables, m is given its technically correct negative value), r is the radius of curvature of an individual lens surface, d is the thickness of a lens element or the aerial distance between two adjacent lens elements, n is the refractive index of an individual lens element (for the d-line, unless otherwise specified), and $\nu$ is the Abbe number of an individual lens element for the d-line. All the values in conditional formulas (1) to (20) were calculated based on the wavelength of the e-line being used as the reference wavelength.

In the following examples, data is presented in tabular form for each of 19 examples. The main table in each of the examples has ten rows labelled by a row number and presents data on characteristics of five lenses (in some cases, four lenses) and their spacings. The first column gives the radii of curvature $r_1$ through $r_{10}$ for both sides of the five lenses (four lenses in some cases). These radii are identified by cross-sectional views of the 19 examples. Table 1 below presents the correspondence between the examples and the figure numbers for the cross-sectional views. the cross-sectional views have similarly identified parameters but the shapes of the 19 example lens systems sometimes differ.

TABLE 1

| | FIG. No. | | | |
|---|---|---|---|---|
| | | Aberration | | |
| Example | View | m = 1.00 | m = 1.42 | m = 0.64 |
| 1 | 1 | 2 | 3 | 4 |
| 2 | 5 | 6 | 7 | 8 |
| 3 | 9 | 10 | 11 | 12 |
| 4 | 13 | 14 | 15 | 16 |
| 5 | 17 | 18 | 19 | 20 |
| 6 | 21 | 22 | 23 | 24 |
| 7 | 25 | 26 | 27 | 28 |
| 8 | 29 | 30 | 31 | 32 |
| 9 | 33 | 34 | 35 | 36 |
| 10 | 37 | 38 | 39 | 40 |
| 11 | 41 | 42 | 43 | 44 |
| 12 | 45 | 46 | 47 | 48 |
| 13 | 49 | 50 | 51 | 52 |
| 14 | 53 | 54 | 55 | 56 |
| 15 | 57 | 58 | 59 | 60 |
| 16 | 61 | 62 | 63 | 64 |
| 17 | 65 | 66 | 67 | 68 |
| 18 | 69 | 70 | 71 | 72 |
| 19 | 73 | 74 | 75 | 76 |

The second columns of the main tables in the examples give the thickness $d_1$, $d_3$, $d_5$ $d_7$ and $d_a$ of the lenses and the inter-lens spacings $d_2$, $d_4$, $d_6$ and $d_8$, also as identified in the cross-sectional views. The third column gives the refractive indices n of the five lenses and the fourth column gives the Abbe number $\nu$ of the lenses. These data are presented in the rows of the corresponding thicknesses.

For each of the examples there are presented aberration curves for different measures of aberration, measured in percentage. Four different graphs are presented; spherical aberration (SA) and sine condition (SC), chromatic aberration for the e-line, d-line and F-line, astigmatism in the safittal (S) direction and the meridional (M) direction and distortion. The first two aberrations are plotted as a function of aperature from 0 to f/6.7. The astigmatism and distortion are plotted as a function of viewing angle, expressed either in degrees or object height y. These curves are given in seperate figures for three values of magnification of the zoom lens, namely 1.00X, 1.42X and 0.64X. Table 1 again provides the correspondence between the examples and the figures representing the aberration.

For each example are given the numerical values for the previously described conditions. These conditions are numbered according to the description of the invention.

Examples 1 through 5 are directed to the first aspect of the invention, as exemplified in the first two preferred embodiments. Examples 6 through 19 are directed to the second aspect of the invention, as exemplified in the third through fifth preferred embodiments. Accordingly, the numerical values of the conditions are given only for those conditions described for those embodiments.

Example 1
$F_{NO}$ 1:6.7  $f_M$ = 188.749  $2\omega$ = 42°–36°
m = −1.42X to −0.62X

| i | $r_i$ | $d_i$ | $n_i$ | $\nu_i$ |
|---|---|---|---|---|
| 1 | 39.480 | 6.34 | 1.65160 | 58.5 |
| 2 | 109.595 | 5.92 | | |
| 3 | −161.460 | 1.80 | 1.59551 | 39.2 |
| 4 | 41.677 | 7.46 | | |
| 5 | 156.204 | 2.00 | 1.54072 | 47.2 |
| 6 | 61.892 | 1.00 | | |
| 7 | 65.777 | 5.17 | 1.71300 | 53.8 |
| 8 | −92.718 | 2.97–18.28 | | |
| 9 | 258.656 | 2.00 | 1.48749 | 70.1 |
| 10 | 110.901 | | | |

Conditions (1) $-f_{II}/f_M$ = 2.112
(3) $f_I/f_M$ = 0.709
(4) $f_{I,1}/f_M$ = 0.482
(5) $f_{I,2}/f_M$ = 0.292

(6) $\sum_{i=1}^{k} 1/(n_{I,i} \cdot f_{I,i})$ = 0.00258

(7) $\sum_{i=1}^{k} 1/(\nu_{I,i} \cdot f_{I,i})$ = −0.0000454

(8) $r_{II,1}/f_M$ = 1.370
(9) $1/(\nu_{II,1} \cdot f_{II})$ = −0.0000358

Example 2
$F_{NO}$ 1:6.7  $f_M$ = 188.613  $2\omega$ = 42°–36°
m = −1.42X to −0.64X

| i | $r_i$ | $d_i$ | $n_i$ | $\nu_i$ |
|---|---|---|---|---|
| 1 | 40.353 | 7.23 | 1.71300 | 53.8 |
| 2 | 159.749 | 3.32 | | |
| 3 | −234.289 | 3.21 | 1.60342 | 38.0 |
| 4 | 36.665 | 10.52 | | |
| 5 | −268.326 | 1.69 | 1.54072 | 47.2 |
| 6 | 708.134 | 1.13 | | |
| 7 | 104.335 | 4.95 | 1.69680 | 55.5 |
| 8 | −88.637 | 2.97–15.93 | | |
| 9 | 209.911 | 2.00 | 1.51633 | 64.1 |
| 10 | 96.939 | | | |

Conditions (1) $-f_{II}/f_M$ = 1.854
(3) $f_I/f_M$ = 0.684
(4) $f_{I,1}/f_M$ = 0.390
(5) $f_{I,2}/f_M$ = 0.276

(6) $\sum_{i=1}^{k} 1/(n_{I,i} \cdot f_{I,i})$ = 0.00264

(7) $\sum_{i=1}^{k} 1/(\nu_{I,i} \cdot f_{I,i})$ = −0.0000523

(8) $r_{II,1}/f_M$ = 1.113
(9) $1/(\nu_{II,1} \cdot f_{II})$ = −0.0000446

Example 3

-continued

| | $F_{NO}$ 1:6.7 $f_M$ = 188.878 2ω = 42°-36° | | | |
|---|---|---|---|---|
| | m = −1.42X to −0.64X | | | |
| i | $r_i$ | $d_i$ | $n_i$ | $\nu_i$ |
| 1 | 40.062 | 6.28 | 1.69680 | 55.5 |
| 2 | 118.007 | 5.65 | | |
| 3 | −210.589 | 1.80 | 1.60342 | 38.0 |
| 4 | 38.509 | 12.19 | | |
| 5 | 97.161 | 4.76 | 1.73400 | 51.5 |
| 6 | −107.374 | 2.99-10.32 | | |
| 7 | 187.680 | 2.00 | 1.60562 | 43.7 |
| 8 | 80.392 | | | |

Conditions (1) $-f_{II}/f_M$ = 1.231
(3) $f_I/f_M$ = 0.591
(4) $f_{I,1}/f_M$ = 0.444
(5) $f_{I,2}/f_M$ = 0.283

(6) $\sum_{i=1}^{k} 1/(n_{I,i} \cdot f_{I,i})$ = 0.00362

(7) $\sum_{i=1}^{k} 1/(\nu_{I,i} \cdot f_{I,i})$ = −0.0000006

(8) $r_{II,1}/f_M$ = 0.994
(9) $1/(\nu_{II,1} \cdot f_{II})$ = −0.0000984

| | Example 4 | | | |
|---|---|---|---|---|
| | $F_{NO}$ 1:6.7 $f_M$ = 188.314 2ω = 42°-36° | | | |
| | m = −1.42X to −0.64X | | | |
| i | $r_i$ | $d_i$ | $n_i$ | $\nu_i$ |
| 1 | 42.101 | 7.30 | 1.67790 | 55.3 |
| 2 | 147.119 | 5.86 | | |
| 3 | −204.554 | 4.65 | 1.62004 | 36.3 |
| 4 | 38.425 | 11.79 | | |
| 5 | 83.017 | 4.43 | 1.69680 | 55.5 |
| 6 | −101.649 | 3.00-9.51 | | |
| 7 | 288.723 | 4.22 | 1.48749 | 70.1 |
| 8 | 75.292 | | | |

Conditions (1) $-f_{II}/f_M$ = 1.113
(3) $f_I/f_M$ = 0.578
(4) $f_{I,1}/f_M$ = 0.447
(5) $f_{I,2}/f_M$ = 0.273

(6) $\sum_{i=1}^{k} 1/(n_{I,i} \cdot f_{I,i})$ = 0.00401

(7) $\sum_{i=1}^{k} 1/(\nu_{I,i} \cdot f_{I,i})$ = −0.0000476

(8) $r_{II,1}/f_M$ = 1.533
(9) $1/(\nu_{II,1} \cdot f_{II})$ = −0.0000681

| | Example 5 | | | |
|---|---|---|---|---|
| | $F_{NO}$ 1:6.7 $f_M$ = 188.483 2ω = 42°-36° | | | |
| | m = −1.42X to −0.64X | | | |
| i | $r_i$ | $d_i$ | $n_i$ | $\nu_i$ |
| 1 | 40.263 | 8.27 | 1.72000 | 50.3 |
| 2 | 115.490 | 3.20 | | |
| 3 | −226.896 | 3.50 | 1.63636 | 35.4 |
| 4 | 38.698 | 11.37 | | |
| 5 | 94.415 | 4.43 | 1.71300 | 53.8 |
| 6 | −98.604 | 3.00-10.23 | | |
| 7 | 254.301 | 2.00 | 1.51112 | 60.5 |
| 8 | 80.469 | | | |

Conditions (1) $-f_{II}/f_M$ = 1.222
(3) $f_I/f_M$ = 0.589
(4) $f_{I,1}/f_M$ = 0.433
(5) $f_{I,2}/f_M$ = 0.272

(6) $\sum_{i=1}^{k} 1/(n_{I,i} \cdot f_{I,i})$ = 0.00380

(7) $\sum_{i=1}^{k} 1/(\nu_{I,i} \cdot f_{I,i})$ = −0.0000335

(8) $r_{II,1}/f_M$ = 1.349
(9) $1/(\nu_{II,1} \cdot f_{II})$ = −0.0000718

| | Example 6: | | | |
|---|---|---|---|---|
| | $F_{NO}$ 1:6.7 $f_M$ = 188.059 2ω = 42°-36° | | | |
| | m = −1.42X to −0.64X | | | |
| i | $r_i$ | $d_i$ | $n_i$ | $\nu_i$ |
| 1 | 37.881 | 7.48 | 1.65844 | 50.9 |
| 2 | 128.819 | 4.13 | | |
| 3 | −206.660 | 2.01 | 1.62004 | 36.3 |
| 4 | 37.833 | 14.70 | | |
| 5 | 108.414 | 5.15 | 1.65160 | 58.5 |
| 6 | −88.437 | 3.00 | −12.34 | |
| 7 | 232.395 | 5.06 | 1.64769 | 33.8 |
| 8 | −133.867 | 1.90 | * | |
| 9 | −111.991 | 2.20 | 1.59551 | 39.2 |
| 10 | 94.121 | | | |

Conditions (2) $f_I/f_M$ = 0.645
(10) $-f_{I,2}/f_M$ = 0.272
(11) $f_{I,1}/f_{I,3}$ = 1.045
(12) $P_I$ = 0.685
(13) $V_I$ = −0.012
(16) $-f_{II}/f_M$ = 1.405
(17) $V_{II}$ = −0.014
(18) $r_1/r_4$ = 1.001
(19) $d_4/d_2$ = 3.559
(20) $r_5/r_6$ = −1.226

| | Example 7: | | | |
|---|---|---|---|---|
| | $F_{NO}$ 1:6.7 $f_M$ = 188.718 2ω = 42°-36° | | | |
| | m = −1.42X to −0.64X | | | |
| i | $r_i$ | $d_i$ | $n_i$ | $\nu_i$ |
| 1 | 37.630 | 7.05 | 1.67003 | 47.3 |
| 2 | 136.652 | 3.97 | | |
| 3 | −202.500 | 2.00 | 1.64769 | 33.8 |
| 4 | 38.823 | 15.68 | | |
| 5 | 129.709 | 5.82 | 1.65844 | 50.9 |
| 6 | −85.200 | 3.00 | −13.60 | |
| 7 | 328.301 | 5.90 | 1.64769 | 33.8 |
| 8 | −99.879 | 3.04 | | |
| 9 | −85.725 | 2.92 | 1.62004 | 36.3 |
| 10 | 121.492 | | | |

Conditions (2) $f_I/f_M$ = 0.669
(10) $-f_{I,2}/f_M$ = 0.264
(11) $f_{I,1}/f_{I,3}$ = 0.954
(12) $P_I$ = 0.655
(13) $V_I$ = −0.012
(16) $-f_{II}/f_M$ = 1.503
(17) $V_{II}$ = −0.018
(18) $r_1/r_4$ = 0.969
(19) $d_4/d_2$ = 3.950
(20) $r_5/r_6$ = −1.522

| | Example 8: | | | |
|---|---|---|---|---|
| | $F_{NO}$ 1:6.7 $f_M$ = 187.767 2ω = 42°-36° | | | |
| | m = −1.42X to −0.64X | | | |
| i | $r_i$ | $d_i$ | $n_i$ | $\nu_i$ |
| 1 | 40.371 | 9.06 | 1.70000 | 47.3 |
| 2 | 122.344 | 3.87 | | |
| 3 | −166.426 | 2.00 | 1.64769 | 33.8 |
| 4 | 42.272 | 13.17 | | |
| 5 | 136.773 | 5.25 | 1.65844 | 50.9 |
| 6 | −80.755 | 3.00 | −16.65 | |
| 7 | 368.379 | 5.64 | 1.64769 | 33.8 |
| 8 | −103.379 | 2.66 | | |

-continued

Example 8:
$F_{NO}$ 1:6.7  $f_M = 187.767$  $2\omega = 42°-36°$
$m = -1.42X$ to $-0.64X$

| i | $r_i$ | $d_i$ | $n_i$ | $\nu_i$ |
|---|---|---|---|---|
| 9 | −89.348 | 1.50 | 1.62004 | 36.3 |
| 10 | 140.566 | | | |

Conditions
(2) $f_I/f_M = 0.708$
(10) $-f_{I,2}/f_M = 0.274$
(11) $f_{I,1}/f_{I,3} = 1.056$
(12) $P_I = 0.595$
(13) $V_I = -0.018$
(16) $-f_{II}/f_M = 1.824$
(17) $V_{II} = -0.008$
(18) $r_1/r_4 = 0.955$
(19) $d_4/d_2 = 3.400$
(20) $r_5/r_6 = -1.694$

Example 9:
$F_{NO}$ 1:6.7  $f_M = 188.507$  $2\omega = 42°-36°$
$m = -1.42X$ to $-0.64X$

| i | $r_i$ | $d_i$ | $n_i$ | $\nu_i$ |
|---|---|---|---|---|
| 1 | 39.385 | 5.94 | 1.74320 | 49.3 |
| 2 | 118.687 | 5.77 | | |
| 3 | −394.760 | 2.00 | 1.64769 | 33.8 |
| 4 | 36.987 | 11.13 | | |
| 5 | 84.462 | 5.00 | 1.71300 | 53.8 |
| 6 | −118.558 | 3.00 | −9.16 | |
| 7 | −593.678 | 2.00 | 1.51112 | 60.5 |
| 8 | 75.911 | 6.09 | | |
| 9 | 188.232 | 5.64 | 1.54814 | 45.8 |
| 10 | 2153.162 | | | |

Conditions
(2) $f_I/f_M = 0.560$
(10) $-f_{I,2}/f_M = 0.275$
(11) $f_{I,1}/f_{I,3} = 1.099$
(12) $P_I = 0.585$
(13) $V_I = -0.007$
(16) $-f_{II}/f_M = 1.097$
(17) $V_{II} = -0.013$
(18) $r_1/r_4 = 1.065$
(19) $d_4/d_2 = 1.929$
(20) $r_5/r_6 = -0.712$

Example 10:
$F_{NO}$ 1:6.7  $f_M = 188.800$  $2\omega = 42°-36°$
$m = -1.42X$ to $-0.64X$

| i | $r_i$ | $d_i$ | $n_i$ | $\nu_i$ |
|---|---|---|---|---|
| 1 | 37.375 | 7.00 | 1.71700 | 47.9 |
| 2 | 145.132 | 3.97 | | |
| 3 | −454.520 | 2.00 | 1.64769 | 33.8 |
| 4 | 33.653 | 10.64 | | |
| 5 | 65.725 | 5.00 | 1.67790 | 53.3 |
| 6 | −118.041 | 3.00 | −6.79 | |
| 7 | −332.384 | 2.00 | 1.51633 | 64.1 |
| 8 | 60.969 | 13.00 | | |
| 9 | 204.017 | 4.00 | 1.50657 | 62.0 |
| 10 | −848.356 | | | |

Conditions
(2) $f_I/f_M = 0.477$
(10) $-f_{I,2}/f_M = 0.253$
(11) $f_{I,1}/f_{I,3} = 1.085$
(12) $P_I = 1.023$
(13) $V_I = -0.002$
(16) $-f_{II}/f_M = 0.807$
(17) $V_{II} = -0.020$
(18) $r_1/r_4 = 1.111$
(19) $d_4/d_2 = 2.68$
(20) $r_5/r_6 = -0.557$

Example 11:
$F_{NO}$ 1:6.7  $f_M = 187.679$  $2\omega = 42°-36°$
$m = -1.42X$ to $-0.64X$

| i | $r_i$ | $d_i$ | $n_i$ | $\nu_i$ |
|---|---|---|---|---|
| 1 | 37.630 | 7.05 | 1.67003 | 47.3 |
| 2 | 133.300 | 4.00 | | |
| 3 | −202.800 | 2.16 | 1.64769 | 33.8 |
| 4 | 38.823 | 15.46 | | |
| 5 | 127.330 | 6.77 | 1.65844 | 50.9 |
| 6 | −85.000 | 3.00 | −13.75 | |
| 7 | 292.600 | 5.80 | 1.64769 | 33.8 |
| 8 | −107.950 | 2.97 | | |
| 9 | −91.900 | 3.00 | 1.62004 | 36.3 |
| 10 | 117.000 | | | |

Conditions
(2) $f_I/f_M = 0.673$
(10) $-f_{I,2}/f_M = 0.265$
(11) $f_{I,1}/f_{I,3} = 0.971$
(12) $P_I = 0.651$
(13) $V_I = -0.012$
(16) $-f_{II}/f_M = 1.525$
(17) $V_{II} = -0.017$
(18) $r_1/r_4 = 0.969$
(19) $d_4/d_2 = 3.865$
(20) $r_5/r_6 = -1.498$

Example 12:
$F_{NO}$ 1:6.7  $f_M = 188.512$  $2\omega = 42°-36°$
$m = -1.42X$ to $-0.64X$

| i | $r_i$ | $d_i$ | $n_i$ | $\nu_i$ |
|---|---|---|---|---|
| 1 | 41.365 | 6.68 | 1.71300 | 53.8 |
| 2 | 111.023 | 4.43 | | |
| 3 | −196.886 | 3.00 | 1.60342 | 38.0 |
| 4 | 42.064 | 12.29 | | |
| 5 | 126.055 | 4.28 | 1.71300 | 53.8 |
| 6 | −99.630 | 3.00 | −15.19 | |
| 7 | 211.976 | 2.00 | 1.54072 | 47.2 |
| 8 | 59.691 | 1.85 | | |
| 9 | 62.044 | 5.07 | 1.65844 | 50.9 |
| 10 | 90.522 | | | |

Conditions
(2) $f_I/f_M = 0.678$
(10) $-f_{I,2}/f_M = 0.301$
(11) $f_{I,1}/f_{I,3} = 1.130$
(12) $P_I = 0.579$
(13) $V_I = -0.003$
(16) $-f_{II}/f_M = 1.749$
(17) $V_{II} = -0.013$
(18) $r_1/r_4 = 0.983$
(19) $d_4/d_2 = 2.774$
(20) $r_5/r_6 = -1.265$

Example 13:
$F_{NO}$ 1:6.7  $f_M = 188.564$  $2\omega = 42°-36°$
$m = -1.42X$ to $-0.64X$

| i | $r_i$ | $d_i$ | $n_i$ | $\nu_i$ |
|---|---|---|---|---|
| 1 | 40.481 | 7.37 | 1.69350 | 53.2 |
| 2 | 129.883 | 4.43 | | |
| 3 | −238.638 | 2.00 | 1.60342 | 38.0 |
| 4 | 38.494 | 15.22 | | |
| 5 | 104.996 | 4.34 | 1.69680 | 55.5 |
| 6 | −104.996 | 3.00 | −11.27 | |
| 7 | 201.874 | 6.00 | 1.54072 | 47.2 |
| 8 | 80.277 | | | |

Conditions
(2) $f_I/f_M = 0.617$
(10) $-f_{I,2}/f_M = 0.289$
(11) $f_{I,1}/f_{I,3} = 1.080$
(12) $P_I = 0.672$
(13) $V_I = -0.003$
(16) $-f_{II}/f_M = 1.324$
(17) $V_{II} = -0.016$
(18) $r_1/r_4 = 1.052$
(19) $d_4/d_2 = 3.436$
(20) $r_5/r_6 = -1.000$
(21) $f_M/r_7 = 0.934$

Example 14:
$F_{NO}$ 1:6.7  $f_M = 189.039$  $2\omega = 42°\text{-}36°$
$m = -1.42X$ to $-0.64X$

| i | $r_i$ | $d_i$ | $n_i$ | $\nu_i$ |
|---|---|---|---|---|
| 1 | 37.423 | 6.38 | 1.69680 | 55.5 |
| 2 | 119.845 | 4.07 | | |
| 3 | −322.140 | 1.80 | 1.60342 | 38.0 |
| 4 | 35.362 | 14.52 | | |
| 5 | 94.811 | 4.46 | 1.72000 | 50.3 |
| 6 | −116.841 | 3.00 | −9.52 | |
| 7 | 188.166 | 2.11 | 1.58144 | 50.8 |
| 8 | 74.991 | | | |

Conditions
(2) $f_I/f_M = 0.571$
(10) $-f_{I,2}/f_M = 0.277$
(11) $f_{I,1}/f_{I,3} = 1.036$
(12) $P_I = 0.729$
(13) $V_I = 0.003$
(16) $-f_{II}/f_M = 1.136$
(17) $V_{II} = 0.017$
(18) $r_1/r_4 = 1.058$
(19) $d_4/d_2 = 3.568$
(20) $r_5/r_6 = -0.811$
(21) $f_M/r_7 = 1.005$

Example 15:
$F_{NO}$ 1:6.7  $f_M = 189.040$  $2\omega = 42°\text{-}36°$
$m = -1.42X$ to $-0.64X$

| i | $r_i$ | $d_i$ | $n_i$ | $\nu_i$ |
|---|---|---|---|---|
| 1 | 43.873 | 9.03 | 1.72000 | 50.2 |
| 2 | 94.897 | 6.81 | | |
| 3 | −119.591 | 1.80 | 1.64769 | 33.8 |
| 4 | 48.020 | 8.79 | | |
| 5 | 120.558 | 3.98 | 1.73400 | 51.5 |
| 6 | −81.298 | 3.00 | −21.79 | |
| 7 | 220.754 | 2.11 | 1.48749 | 70.1 |
| 8 | 111.590 | | | |

Conditions
(2) $f_I/f_M = 0.740$
(10) $-f_{I,2}/f_M = 0.277$
(11) $f_{I,1}/f_{I,3} = 1.581$
(12) $P_I = 0.495$
(13) $V_I = -0.016$
(16) $-f_{II}/f_M = 2.456$
(17) $V_{II} = -0.006$
(18) $r_1/r_4 = 0.914$
(19) $d_4/d_2 = 1.291$
(20) $r_5/r_6 = -1.483$
(21) $f_M/r_7 = 0.856$

Example 16:
$F_{NO}$ 1:6.7  $f_M = 189.410$  $2\omega = 42°\text{-}36°$
$m = -1.42X$ to $-0.64X$

| i | $r_i$ | $d_i$ | $n_i$ | $\nu_i$ |
|---|---|---|---|---|
| 1 | 43.245 | 5.73 | 1.72916 | 54.7 |
| 2 | 130.460 | 7.58 | | |
| 3 | −216.643 | 1.80 | 1.61293 | 37.0 |
| 4 | 41.000 | 13.82 | | |
| 5 | 105.520 | 4.31 | 1.71300 | 53.8 |
| 6 | −109.228 | 3.00 | −12.22 | |
| 7 | 219.229 | 2.11 | 1.50137 | 56.4 |
| 8 | 84.243 | | | |

Conditions
(2) $f_I/f_M = 0.631$
(10) $-f_{I,2}/f_M = 0.294$
(11) $f_{I,1}/f_{I,3} = 1.138$
(12) $P_I = 0.631$
(13) $V_I = -0.005$
(16) $-f_{II}/f_M = 1.442$
(17) $V_{II} = -0.012$
(18) $r_1/r_4 = 1.055$
(19) $d_4/d_2 = 1.823$
(20) $r_5/r_6 = -0.966$
(21) $f_M/r_7 = 0.862$

Example 17:
$F_{NO}$ 1:6.7  $f_M = 188.924$  $2\omega = 42°\text{-}36°$
$m = -1.42X$ to $-0.64X$

| i | $r_i$ | $d_i$ | $n_i$ | $\nu_i$ |
|---|---|---|---|---|
| 1 | 36.154 | 6.47 | 1.69680 | 55.5 |
| 2 | 129.374 | 2.70 | | |
| 3 | −478.119 | 1.80 | 1.58144 | 40.7 |
| 4 | 32.424 | 17.20 | | |
| 5 | 82.516 | 4.56 | 1.69350 | 53.2 |
| 6 | −124.577 | 3.00-7.62 | | |
| 7 | 175.501 | 2.11 | 1.58144 | 40.7 |
| 8 | 63.185 | | | |

Conditions
(2) $f_I/f_M = 0.515$
(10) $-f_{I,2}/f_M = 0.274$
(11) $f_{I,1}/f_{I,3} = 0.969$
(12) $P_I = 0.845$
(13) $V_I = 0.009$
(16) $-f_{II}/f_M = 0.900$
(17) $V_{II} = -0.027$
(18) $r_1/r_4 = 1.115$
(19) $d_4/d_2 = 6.370$
(20) $r_5/r_6 = -0.662$
(21) $f_M/r_7 = 1.076$

Example 18:
$F_{NO}$ 1:6.7  $f_M = 188.940$  $2\omega = 42°\text{-}36°$
$m = -1.42X$ to $-0.64X$

| i | $r_i$ | $d_i$ | $n_i$ | $\nu_i$ |
|---|---|---|---|---|
| 1 | 36.092 | 6.44 | 1.72916 | 54.7 |
| 2 | 120.718 | 2.48 | | |
| 3 | −738.498 | 1.80 | 1.58144 | 40.7 |
| 4 | 31.800 | 17.79 | | |
| 5 | 81.786 | 4.61 | 1.69350 | 53.2 |
| 6 | −117.211 | 3.00-8.06 | | |
| 7 | 197.585 | 2.11 | 1.53172 | 48.9 |
| 8 | 64.447 | | | |

Conditions
(2) $f_I/f_M = 0.530$
(10) $-f_{I,2}/f_M = 0.276$
(11) $f_{I,1}/f_{I,3} = 0.900$
(12) $P_I = 0.785$
(13) $V_I = 0.009$
(16) $-f_{II}/f_M = 0.953$
(17) $V_{II} = -0.021$
(18) $r_1/r_4 = 1.135$
(19) $d_4/d_2 = 7.17$
(20) $r_5/r_6 = -0.698$
(21) $f_M/r_7 = 0.956$

Example 19:
$F_{NO}$ 1:6.7  $f_M = 188.749$  $2\omega = 42°\text{-}36°$
$m = -1.42X$ to $-0.64X$

| i | $r_i$ | $d_i$ | $n_i$ | $\nu_i$ |
|---|---|---|---|---|
| 1 | 37.319 | 8.11 | 1.67003 | 47.3 |
| 2 | 141.874 | 2.63 | | |
| 3 | −266.489 | 1.80 | 1.63980 | 34.5 |
| 4 | 35.916 | 14.36 | | |
| 5 | 93.313 | 4.45 | 1.78590 | 44.2 |
| 6 | −116.513 | 3.00-8.01 | | |
| 7 | 160.695 | 2.11 | 1.66680 | 33.0 |
| 8 | 68.624 | | | |

Conditions
(2) $f_I/f_M = 0.527$
(10) $-f_{I,2}/f_M = 0.260$
(11) $f_{I,1}/f_{I,3} = 1.100$
(12) $P_I = 0.798$
(13) $V_I = 0.008$
(16) $-f_{II}/f_M = 0.954$
(17) $V_{II} = -0.032$
(18) $r_1/r_4 = 1.039$
(19) $d_4/d_2 = 5.46$
(20) $r_5/r_6 = -0.801$
(21) $f_M/r_7 = 1.175$

What is claimed is:
1. A zoom lens, comprising:

a first lens component having a positive focal length $f_I$; and a second lens component having a negative focal length $f_{II}$, a distance between said first and second lens groups being variable during zooming, a focal length of said a system comprising said first and second lens components being $f_M$ at a magnification of 1.00X;

wherein said first lens component comprises at least three and no more than four lens elements and said second lens component comprises at least one and no more than two lens elements; and wherein $$0.35 < f_I/f_M < 0.85.$$

2. A zoom lens as recited in claim 1, wherein said first lens component is disposed between an object plane and said second lens component.

3. A zoom lens as recited in claim 1, wherein said second lens component is disposed between an object plane and said first lens component.

4. A zoom lens as recited in claim 1, wherein said first lens component comprises a first positive lens element, a second negative lens element and a third positive lens element.

5. A zoom lens as recited in claim 4:

wherein $f_{I,i}$ is a focal length, $n_{I,i}$ is a refractive index and $\nu_{I,i}$ is an Abbe number of the i-th lens element of said first lens component as numbered toward said second lens component; and wherein $$0.2 < -f_{I,2}/f_M < 0.4 \text{ and } f_{I,2} < 0,$$

$$0.7 < f_{I,1}/f_{I,3} < 2.0,$$

$$0.35 < P_I < 1.3, \text{ and}$$

$$|V_I| < 0.04 \text{ where}$$

$$P_I = \sum_{i=1}^{k} f_M/(n_{I,i} \cdot f_{I,i})$$

and $$V_I = \sum_{i=1}^{k} f_M/(\nu_{I,i} \cdot f_{I,i}).$$

6. A zoom lens as recited in claim 4, wherein said second lens component consists of one positive lens element and one negative lens element.

7. A zoom lens as recited in claim 4, wherein said second lens component consists of one negative lens element.

8. A zoom lens as recited in claim 5:

wherein $f_{II,i}$ is a focal length and $\nu_{II,i}$ is an Abbe number of an i-th lens element in said second lens component as numbered away from said first lens component and wherein $$0.6 < -f_{II}/f_M < 3.3 \text{ and } f_{II} < 0, \text{ and}$$

$$-0.06 < V_{II} < 0,$$

where $$V_{II} = \{(1/(\nu_{II,1} \cdot f_{II,1}) + 1/(\nu_{II,2} \cdot f_{II,1}))\} \times f_M.$$

9. A zoom lens as recited in claim 1, wherein said second lens component consists of a single negative miniscus lens having its convex surface directed toward said first lens component and wherein $$0.7 < -f_{II}/f_M < 3.0.$$

10. A zoom lens as recited in claim 9, wherein said first lens component comprises a positive meniscus first lens element with its convex surface directed away from said second lens component, a negative second lens element and a positive third lens element, wherein $$0.3 < f_{I,1}/f_M < 0.6$$

$$0.15 < f_{I,2}/f_M < 0.45$$

$$0.001 < \sum_{i=1}^{k} 1/(n_{I,i} \cdot f_{I,i}) < 0.006, \text{ and}$$

$$\left| \sum_{i=1}^{k} 1/(\nu_{I,i} \cdot f_{I,i}) \right| < 0.001$$

where $f_{I,i}$ is a focal length, $n_{I,i}$ is a refractive index and $\nu_{I,i}$ is an Abbe number of the i-th lens element in said first lens component as numbered towards said second lens component and said first lens component consists of k lens elements.

11. A zoom lens as recited in claim 10, wherein k=3.

12. A zoom lens as recited in claim 10, wherein k=4 and said first lens component further comprises a negative fourth lens element between said second and third lens elements.

13. A zoom lens as recited in claim 9, wherein $$0.6 < r_{II,1}/f_M < 2.0 \text{ and}$$

$$-0.0002 < 1/(\nu_{II,1} \cdot f_{II}) < 0.0,$$

wherein $r_{II,1}$ is a radius of curvature of said negative meniscus lens element of said second lens component facing said first lens component and $\nu_{II,1}$ is an Abbe number of said negative meniscus lens.

14. A zoom lens sytem as recited in claim 1:

wherein $r_i$ is the radius of curvature of the i-th lens surface numbered form the object side, $d_i$ is the distance between the i-th and (i+1)-th lens surfaces, and $n_i$ and $\nu_i$ are the refractive index and Abbe number, respectively, of a lens having thickness $d_i$;

wherein said first lens component consists of four lens elements and said second lens group consists of one lens element; and wherein said lens elements satisfy the following table:

| i | $r_i$ | $d_i$ | $n_i$ | $\nu_i$ |
|---|---|---|---|---|
| 1 | 39.480 | 6.34 | 1.65160 | 58.5 |
| 2 | 109.595 | 5.92 | | |
| 3 | −161.460 | 1.80 | 1.59551 | 39.2 |
| 4 | 41.677 | 7.46 | | |
| 5 | 156.204 | 2.00 | 1.54072 | 47.2 |
| 6 | 61.892 | 1.00 | | |
| 7 | 65.777 | 5.17 | 1.71300 | 53.8 |
| 8 | −92.718 | 2.97–18.28 | | |
| 9 | 258.656 | 2.00 | 1.48749 | 70.1 |
| 10 | 110.901. | | | |

15. A zoom lens as recited in claim 1:

wherein $r_i$ is the radius of curvature of the i-th lens surface numbered from the object side, $d_i$ is the distance between the i-th and (i+1)-th lens surfaces, and $n_i$ and $\nu_i$ are the refractive index and Abbe number, respectively, of a lens having thickness $d_i$;

wherein said first lens component consists of three lens elements and said second lens component consists of two lens elements; and wherein said lens elements satisfy the following table:

| i | $r_i$ | $d_i$ | $n_i$ | $\nu_i$ |
|---|---|---|---|---|
| 1 | 37.881 | 7.48 | 1.65844 | 50.9 |
| 2 | 128.819 | 4.13 | | |
| 3 | −206.660 | 2.01 | 1.62004 | 36.3 |
| 4 | 37.833 | 14.70 | | |
| 5 | 108.414 | 5.15 | 1.65160 | 58.5 |
| 6 | −88.437 | 3.00–12.34 | | |
| 7 | 232.395 | 5.06 | 1.64769 | 33.8 |
| 8 | −133.867 | 1.90 | | |
| 9 | −111.991 | 2.20 | 1.59551 | 39.2 |
| 10 | 94.121. | | | |

16. A zoom lens as recited in claim 1:

wherein $r_i$ is the radius of curvature of the i-th lens surface numbered from the object side, $d_i$ is the distance between the i-th and (i+1)-th lens surfaces, and $n_i$ and $\nu_i$ are the refractive index and Abbe number, respectively, of a lens having thickness $d_i$;

wherein said first lens component consists of three lens elements and said second lens component consists of two lens elements; and wherein said lens elements satisfy the following table:

| i | $r_i$ | $d_i$ | $n_i$ | $\nu_i$ |
|---|---|---|---|---|
| 1 | 37.630 | 7.05 | 1.67003 | 47.3 |
| 2 | 136.652 | 3.97 | | |
| 3 | −202.500 | 2.00 | 1.64769 | 33.8 |
| 4 | 38.823 | 15.68 | | |
| 5 | 129.709 | 5.82 | 1.65844 | 50.9 |
| 6 | −85.200 | 3.00–13.60 | | |
| 7 | 328.301 | 5.90 | 1.64769 | 33.8 |
| 8 | −99.879 | 3.04 | | |
| 9 | −85.725 | 2.92 | 1.62004 | 36.3 |
| 10 | 121.492. | | | |

17. A zoom lens as recited in claim 1:

wherein $r_i$ is the radius of curvature of the i-th lens surface numbered from the object side, $d_i$ is the distance between the i-th and (i+1)-th lens surfaces, and $n_i$ and $\nu_i$ are the refractive index and Abbe number, respectively, of a lens having thickness $d_i$;

wherein said first lens component consists of three lens elements and said second lens component consists of two lens elements; and wherein said lens elements satisfy the following table:

| i | $r_i$ | $d_i$ | $n_i$ | $\nu_i$ |
|---|---|---|---|---|
| 1 | 40.371 | 9.06 | 1.70000 | 47.3 |
| 2 | 122.344 | 3.87 | | |
| 3 | −166.426 | 2.00 | 1.64769 | 33.8 |
| 4 | 42.272 | 13.17 | | |
| 5 | 136.773 | 5.25 | 1.65844 | 50.9 |
| 6 | −80.755 | 3.00–16.65 | | |
| 7 | 368.379 | 5.64 | 1.64769 | 33.8 |
| 8 | −103.379 | 2.66 | | |

-continued

| i | $r_i$ | $d_i$ | $n_i$ | $\nu_i$ |
|---|---|---|---|---|
| 9 | −89.348 | 1.50 | 1.62004 | 36.3 |
| 10 | 140.566. | | | |

18. A zoom lens as recited in claim 1:

wherein $r_i$ is the radius of curvature of the i-th lens surface numbered from the object side, $d_i$ is the distance between the i-th and (i+1)-th lens surfaces, and $n_i$ and $\nu_i$ are the refractive index and Abbe number, respectively, of a lens having thickness $d_i$;

wherein said first lens component consists of three lens elements and said second lens component consists of two lens elements; and wherein said lens elements satisfy the following table:

| i | $r_i$ | $d_i$ | $n_i$ | $\nu_i$ |
|---|---|---|---|---|
| 1 | 39.385 | 5.94 | 1.74320 | 49.3 |
| 2 | 118.687 | 5.77 | | |
| 3 | −394.760 | 2.00 | 1.64769 | 33.8 |
| 4 | 36.987 | 11.13 | | |
| 5 | 84.462 | 5.00 | 1.71300 | 53.8 |
| 6 | −118.558 | 3.00–9.16 | | |
| 7 | −593.678 | 2.00 | 1.51112 | 60.5 |
| 8 | 75.911 | 6.09 | | |
| 9 | 188.232 | 5.64 | 1.54814 | 45.8 |
| 10 | 2153.162. | | | |

19. A zoom lens as recited in claim 1:

wherein $r_i$ is the radius of curvature of the i-th lens surface numbered from the object side, $d_i$ is the distance between the i-th and (i+1)-th lens surfaces, and $n_i$ and $\nu_i$ are the refractive index and Abbe number, respectively, of a lens having thickness $d_i$;

wherein said first lens component consists of three lens elements and said second lens component consists of two lens elements; and wherein said lens elements satisfy the following table:

| i | $r_i$ | $d_i$ | $n_i$ | $\nu_i$ |
|---|---|---|---|---|
| 1 | 37.375 | 7.00 | 1.71700 | 47.9 |
| 2 | 145.132 | 3.97 | | |
| 3 | −454.520 | 2.00 | 1.64769 | 33.8 |
| 4 | 33.653 | 10.64 | | |
| 5 | 65.725 | 5.00 | 1.67790 | 53.3 |
| 6 | −118.041 | 3.00–6.79 | | |
| 7 | −332.384 | 2.00 | 1.51633 | 64.1 |
| 8 | 60.969 | 13.00 | | |
| 9 | 204.017 | 4.00 | 1.50657 | 62.0 |
| 10 | −848.356. | | | |

20. A zoom lens as recited in claim 1:

wherein $r_i$ is the radius of curvature of the i-th lens surface numbered from the object side, $d_i$ is the distance between the i-th and (i+1)-th lens surfaces, and $n_i$ and $\nu_i$ are the refractive index and Abbe number, respectively, of a lens having thickness $d_i$;

wherein said first lens component consists of three lens elements and said second lens component consists of two lens elements; and wherein said lens elements satisfy the following table:

| i | $r_i$ | $d_i$ | $n_i$ | $\nu_i$ |
|---|---|---|---|---|
| 1 | 37.630 | 7.05 | 1.67003 | 47.3 |
| 2 | 133.300 | 4.00 | | |
| 3 | −202.800 | 2.16 | 1.64769 | 33.8 |
| 4 | 38.823 | 15.46 | | |
| 5 | 127.330 | 6.77 | 1.65844 | 50.9 |
| 6 | −85.000 | 3.00−13.75 | | |
| 7 | 292.600 | 5.80 | 1.64769 | 33.8 |
| 8 | −107.950 | 2.97 | | |
| 9 | −91.900 | 3.00 | 1.62004 | 36.3 |
| 10 | 117.000. | | | |

21. A zoom lens as recited in claim 1:
wherein $r_i$ is the radius of curvature of the i-th lens surface numbered from the object side, $d_i$ is the distance between the i-th and (i+1)-th lens surfaces, and $n_i$ and $\nu_i$ are the refractive index and Abbe number, respectively, of a lens having thickness $d_i$;
wherein said first lens component consists of three lens elements and said second lens component consists of two lens elements; and
wherein said lens elements satisfy the following table:

| i | $r_i$ | $d_i$ | $n_i$ | $\nu_i$ |
|---|---|---|---|---|
| 1 | 41.365 | 6.68 | 1.71300 | 53.8 |
| 2 | 111.023 | 4.43 | | |
| 3 | −196.886 | 3.00 | 1.60342 | 38.0 |
| 4 | 42.064 | 12.29 | | |
| 5 | 126.055 | 4.28 | 1.71300 | 53.8 |
| 6 | −99.630 | 3.00−15.19 | | |
| 7 | 211.976 | 2.00 | 1.54072 | 47.2 |
| 8 | 59.691 | 1.85 | | |
| 9 | 62.044 | 5.07 | 1.65844 | 50.9 |
| 10 | 90.522. | | | |

22. A zoom lens as recited in claim 8:
wherein $r_i$ is the radius of curvature of the i-th lens surface numbered from the object side, $d_i$ is the distance between the i-th and (i+1)-th lens surfaces, and $n_i$ and $\nu_i$ are the refractive index and Abbe number, respectively, of a lens having thickness $d_i$;
wherein said first lens component consists of four lens elements and said second lens component consists of one lens element; and
wherein said lens elements satisfy the following table:

| i | $r_i$ | $d_i$ | $n_i$ | $\nu_i$ |
|---|---|---|---|---|
| 1 | 40.353 | 7.23 | 1.71300 | 53.8 |
| 2 | 159.749 | 3.32 | | |
| 3 | −234.289 | 3.21 | 1.60342 | 38.0 |
| 4 | 36.665 | 10.52 | | |
| 5 | −268.326 | 1.69 | 1.54072 | 47.2 |
| 6 | 708.134 | 1.13 | | |
| 7 | 104.335 | 4.95 | 1.69680 | 55.5 |
| 8 | −88.637 | 2.97−15.93 | | |
| 9 | 209.911 | 2.00 | 1.51633 | 64.1 |
| 10 | 96.939. | | | |

23. A zoom lens as recited in claim 8:
wherein $r_i$ is the radius of curvature of the i-th lens surface numbered from the object side, $d_i$ is the distance between the i-th and (i+1)-th lens surfaces, and $n_i$ and $\nu_i$ are the refractive index and Abbe number, respectively, of a lens having thickness $d_i$;
wherein said first lens component consists of three lens elements and said second lens component consists of one lens element; and
wherein said lens elements satisfy the following table:

| i | $r_i$ | $d_i$ | $n_i$ | $\nu_i$ |
|---|---|---|---|---|
| 1 | 40.062 | 6.28 | 1.69680 | 55.3 |
| 2 | 118.007 | 5.65 | | |
| 3 | −210.589 | 1.80 | 1.60342 | 38.0 |
| 4 | 38.509 | 12.19 | | |
| 5 | 97.161 | 4.76 | 1.73400 | 51.5 |
| 6 | −107.374 | 2.99−10.32 | | |
| 7 | 187.680 | 2.00 | 1.60562 | 43.7 |
| 8 | 80.392. | | | |

24. A zoom lens as recited in claim 8:
wherein $r_i$ is the radius of curvature of the i-th lens surface numbered from the object side, $d_i$ is the distance between the i-th and (i+1)-th lens surfaces, and $n_i$ and $\nu_i$ are the refractive index and Abbe number, respectively, of a lens having thickness $d_i$;
wherein said first lens component consists of three lens elements and said second lens component consists of one lens element; and
wherein said lens elements satisfy the following table:

| i | $r_i$ | $d_i$ | $n_i$ | $\nu_i$ |
|---|---|---|---|---|
| 1 | 42.101 | 7.30 | 1.67790 | 55.3 |
| 2 | 147.119 | 5.86 | | |
| 3 | −204.554 | 4.65 | 1.62004 | 36.3 |
| 4 | 38.425 | 11.79 | | |
| 5 | 83.017 | 4.43 | 1.69680 | 55.5 |
| 6 | −101.649 | 3.00−9.51 | | |
| 7 | 288.723 | 4.22 | 1.48749 | 70.1 |
| 8 | 75.292. | | | |

25. A zoom lens as recited in claim 8:
wherein $r_i$ is the radius of curvature of the i-th lens surface numbered from the object side, $d_i$ is the distance between the i-th and (i+1)-th lens surfaces, and $n_i$ and $\nu_i$ are the refractive index and Abbe number, respectively, of a lens having thickness $d_i$;
wherein said first lens component consists of three lens elements and said second lens component consists of one lens element; and
wherein said lens elements satisfy the following table:

| i | $r_i$ | $d_i$ | $n_i$ | $\nu_i$ |
|---|---|---|---|---|
| 1 | 40.263 | 8.27 | 1.72000 | 50.3 |
| 2 | 115.490 | 3.20 | | |
| 3 | −226.896 | 3.50 | 1.63636 | 35.4 |
| 4 | −38.698 | 11.37 | | |
| 5 | 94.415 | 4.43 | 1.71300 | 53.8 |
| 6 | −98.604 | 3.00−10.23 | | |
| 7 | 254.301 | 2.00 | 1.51112 | 60.5 |
| 8 | 80.469. | | | |

26. A zoom lens as recited in claim 11:
wherein $r_i$ is the radius of curvature of the i-th lens surface numbered from the object side, $d_i$ is the distance between the i-th and (i+1)-th lens surfaces, and $n_i$ and $\nu_i$ are the refractive index and Abbe number, respectively, of a lens having thickness $d_i$;

wherein said first lens component consists of three lens elements and said second lens component consists of one lens element; and wherein said lens elements satisfy the following table:

| i | $r_i$ | $d_i$ | $n_i$ | $\nu_i$ |
|---|---|---|---|---|
| 1 | 40.481 | 7.37 | 1.69350 | 53.2 |
| 2 | 129.883 | 4.43 | | |
| 3 | −238.638 | 2.00 | 1.60342 | 38.0 |
| 4 | 38.494 | 15.22 | | |
| 5 | ·104.996 | 4.34 | 1.69680 | 55.5 |
| 6 | −104.996 | 3.00–11.27 | | |
| 7 | 201.874 | 6.00 | 1.54072 | 47.2 |
| 8 | 80.277. | | | |

27. A zoom lens as recited in claim 11:
wherein $r_i$ is the radius of curvature of the i-th lens surface numbered from the object side, $d_i$ is the distance between the i-th and (i+1)-th lens surfaces, and $n_i$ and $\nu_i$ are the refractive index and Abbe number, respectively, of a lens having thickness $d_i$;
wherein said first lens component consists of three lens elements and said second lens component consists of one lens element; and
wherein said lens elements satisfy the following table:

| i | $r_i$ | $d_i$ | $n_i$ | $\nu_i$ |
|---|---|---|---|---|
| 1 | 37.423 | 6.38 | 1.69680 | 55.5 |
| 2 | 119.845 | 4.07 | | |
| 3 | −322.140 | 1.80 | 1.60342 | 38.0 |
| 4 | 35.362 | 14.52 | | |
| 5 | 94.811 | 4.46 | 1.72000 | 50.3 |
| 6 | −116.841 | 3.00–9.52 | | |
| 7 | 188.166 | 2.11 | 1.58144 | 50.8 |
| 8 | 74.991 | | | |

28. A zoom lens as recited in claim 11:
wherein $r_i$ is the radius of curvature of the i-th lens surface numbered from the object side, $d_i$ is the distance between the i-th and (i+1)-th lens surfaces, and $n_i$ and $\nu_i$ are the refractive index and Abbe number, respectively, of a lens having thickness $d_i$;
wherein said first lens component consists of three lens elements and said second lens component consists of one lens element; and
wherein said lens elements satisfy the following table:

| i | $r_i$ | $d_i$ | $n_i$ | $\nu_i$ |
|---|---|---|---|---|
| 1 | 43.873 | 9.03 | 1.72000 | 50.2 |
| 2 | 94.897 | 6.81 | | |
| 3 | −119.591 | 1.80 | 1.64769 | 33.8 |
| 4 | 48.020 | 8.79 | | |
| 5 | 120.558 | 3.98 | 1.73400 | 51.5 |
| 6 | −81.298 | 3.00–21.79 | | |
| 7 | 220.754 | 2.11 | 1.48749 | 70.1 |
| 8 | 111.590. | | | |

29. A zoom lens as recited in claim 11:
wherein $r_i$ is the radius of curvature of the i-th lens surface numbered from the object side, $d_i$ is the distance between the i-th and (i+1)-th lens surfaces, and $n_i$ and $\nu_i$ are the refractive index and Abbe number, respectively, of a lens having thickness $d_i$;

wherein said first lens component consists of three lens elements and said second lens component consists of one lens element; and wherein said lens elements satisfy the following table:

| i | $r_i$ | $d_i$ | $n_i$ | $\nu_i$ |
|---|---|---|---|---|
| 1 | 43.245 | 5.73 | 1.72916 | 54.7 |
| 2 | 130.460 | 7.58 | | |
| 3 | −216.643 | 1.80 | 1.61293 | 37.0 |
| 4 | 41.000 | 13.82 | | |
| 5 | 105.520 | 4.31 | 1.71300 | 53.8 |
| 6 | −109.228 | 3.00–12.22 | | |
| 7 | 219.229 | 2.11 | 1.50137 | 56.4 |
| 8 | 84.243. | | | |

30. A zoom lens as recited in claim 11:
wherein $r_i$ is the radius of curvature of the i-th lens surface numbered from the object side, $d_i$ is the distance between the i-th and (i+1)-th lens surfaces, and $n_i$ and $\nu_i$ are the refractive index and Abbe number, respectively, of a lens having thickness $d_i$;
wherein said first lens component consists of three lens elements and said second lens component consists of one lens element; and
wherein said lens elements satisfy the following table:

| i | $r_i$ | $d_i$ | $n_i$ | $\nu_i$ |
|---|---|---|---|---|
| 1 | 36.154 | 6.47 | 1.69680 | 55.5 |
| 2 | 129.374 | 2.70 | | |
| 3 | −478.119 | 1.80 | 1.58144 | 40.7 |
| 4 | 32.424 | 17.20 | | |
| 5 | 82.516 | 4.56 | 1.69350 | 53.2 |
| 6 | −124.577 | 3.00–7.62 | | |
| 7 | 175.501 | 2.11 | 1.58144 | 40.7 |
| 8 | 63.185. | | | |

31. A zoom lens as recited in claim 11:
wherein $r_i$ is the radius of curvature of the i-th lens surface numbered from the object side, $d_i$ is the distance between the i-th and (i+1)-th lens surfaces, and $n_i$ and $\nu_i$ are the refractive index and Abbe number, respectively, of a lens having thickness $d_i$;
wherein said first lens component consists of three lens elements and said second lens component consists of one lens element; and
wherein said lens elements satisfy the following table:

| i | $r_i$ | $d_i$ | $n_i$ | $\nu_i$ |
|---|---|---|---|---|
| 1 | 36.092 | 6.44 | 1.72916 | 54.7 |
| 2 | 120.718 | 2.48 | | |
| 3 | −738.498 | 1.80 | 1.58144 | 40.7 |
| 4 | 31.800 | 17.79 | | |
| 5 | 81.786 | 4.61 | 1.69350 | 53.2 |
| 6 | −117.211 | 3.00–8.06 | | |
| 7 | 197.585 | 2.11 | 1.53172 | 48.9 |
| 8 | 64.447. | | | |

32. A zoom lens as recited in claim 11:
wherein $r_i$ is the radius of curvature of the i-th lens surface numbered from the object side, $d_i$ is the distance between the i-th and (i+1)-th lens surfaces, and $n_i$ and $\nu_i$ are the refractive index and Abbe number, respectively, of a lens having thickness $d_i$;

wherein said first lens component consists of three lens elements and said second lens component consists of one lens element; and wherein said lens elements satisfy the following table:

| i | $r_i$ | $d_i$ | $n_i$ | $\nu_i$ |
|---|---|---|---|---|
| 1 | 37.319 | 8.11 | 1.67003 | 47.3 |
| 2 | 141.874 | 2.63 | | |
| 3 | −266.489 | 1.80 | 1.63980 | 34.5 |
| 4 | 35.916 | 14.36 | | |
| 5 | 93.313 | 4.45 | 1.78590 | 44.2 |
| 6 | −116.513 | 3.00−8.01 | | |
| 7 | 160.695 | 2.11 | 1.66680 | 33.0 |
| 8 | 68.624. | | | |

33. A zoom lens, comprising:

a first lens component having a positive focal length $f_I$; and a second lens component having a negative focal length $f_{II}$ a distance between said first and second lens components being variable during zooming, a focal length of said a system comprising said first and second lens components being $f_M$ at a magnification of 1.00X;

wherein said first lens group component comprises three lens elements and said second lens component consists of a single negative meniscus lens having its convex surface directed toward from said first lens component; and wherein $$0.7 < -f_{II}/f_M < 3.0.$$

34. A zoom lens as recited in claim 33, wherein $$0.6 < r_{II,1}/f_M < 2.0 \text{ and}$$

$$-0.0002 < 1/(\nu_{II,1} \cdot f_{II}) < 0.0,$$

wherein $r_{II,1}$ is a radius of curvature of said negative meniscus lens element of said second lens component facing said first lens component and $\nu_{II,1}$ is an Abbe number of said negative meniscus lens.

35. A zoom lens as recited in claim 33, wherein said first lens component comprises no more than four lens elements.

* * * * *